United States Patent
Imaki et al.

(10) Patent No.: US 9,470,848 B2
(45) Date of Patent: Oct. 18, 2016

(54) FLUID COUPLER DEVICE AND INTERFACE STRUCTURE OF DAUGHTERBOARD

(71) Applicant: JAPAN AVIATION ELECTRONICS INDUSTRY, LIMITED, Tokyo (JP)

(72) Inventors: Osamu Imaki, Tokyo (JP); Hideto Shimazu, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 477 days.

(21) Appl. No.: 14/057,164

(22) Filed: Oct. 18, 2013

(65) Prior Publication Data

US 2014/0151999 A1    Jun. 5, 2014

(30) Foreign Application Priority Data

Nov. 30, 2012  (JP) ................................. 2012-262863

(51) Int. Cl.
*F16L 37/56* (2006.01)
*G02B 6/38* (2006.01)
*G02B 6/42* (2006.01)

(52) U.S. Cl.
CPC .............. *G02B 6/3814* (2013.01); *F16L 37/56* (2013.01); *G02B 6/4268* (2013.01)

(58) Field of Classification Search
CPC ... G02B 6/3814; G02B 6/4268; F16L 37/22; F16L 37/23
USPC ...................... 285/276, 322, 124.3
See application file for complete search history.

(56) References Cited

U.S. PATENT DOCUMENTS 2,512,999 A * 6/1950 Bruning .................. F16L 37/23
285/277
2,858,848 A * 11/1958 Wittren .................. F16L 37/367
137/269
3,168,335 A * 2/1965 Sumption ............... F16L 37/23
285/277
4,664,149 A * 5/1987 Fremy ..................... F16L 37/23
137/614.01

(Continued)

FOREIGN PATENT DOCUMENTS

CN    101840035 A    9/2010
CN    102484335 A    5/2012

(Continued)

OTHER PUBLICATIONS

China Office action, mail date is Feb. 5, 2015, together with an English-language translation.
Stäubli Corporation, "CGO/CGD, Thermal Management and Cooling of Electronics," Apr. 5, 2011, pp. 1-12.

*Primary Examiner* — David E Bochna
(74) *Attorney, Agent, or Firm* — Greenblum & Bernstein, P.L.C.

(57) ABSTRACT

A receptacle has a backward-movable floating mechanism and includes a receptacle-side slider, a first lock mechanism (first ball) functioning to couple and fix the receptacle to a plug, and a second lock mechanism (second ball, indentation) that prevents the backward movement. The plug includes a plug-side slider and an indentation. When the plug is inserted into the receptacle, the plug-side slider is prevented from moving forward by the first ball and only the housing of the plug moves forward. When connection between male and female members is complete, the first ball fits into the indentation and the plug-side slider moves forward to lock the first ball. The receptacle-side slider is pushed backward by the plug-side slider, the second lock mechanism is unlocked and the housing of the receptacle is moved backward by the floating mechanism.

6 Claims, 30 Drawing Sheets

(56) References Cited

U.S. PATENT DOCUMENTS

| | | | |
|---|---|---|---|
| 4,673,313 A | 6/1987 | Baugh et al. | |
| 4,949,745 A * | 8/1990 | McKeon | F16L 37/23 137/15.09 |
| 6,302,147 B1 * | 10/2001 | Rose | F16L 37/56 137/614.03 |
| 6,523,861 B1 * | 2/2003 | Clancy | F16L 37/23 285/316 |
| 7,575,024 B2 * | 8/2009 | Zeiber | F16L 29/04 137/614.03 |
| 7,793,914 B2 * | 9/2010 | Danielson | F16L 37/0848 251/149.6 |
| 7,857,361 B1 * | 12/2010 | Hanser | F16L 37/1215 285/322 |
| 8,267,431 B2 * | 9/2012 | Okuno | F16L 37/133 285/322 |
| 9,115,838 B2 * | 8/2015 | Konishi | F16L 37/23 |

FOREIGN PATENT DOCUMENTS

| | | | |
|---|---|---|---|
| DE | 19911208 A1 * | 9/2000 | F16L 37/23 |
| EP | 0800234 A1 | 10/1997 | |

* cited by examiner

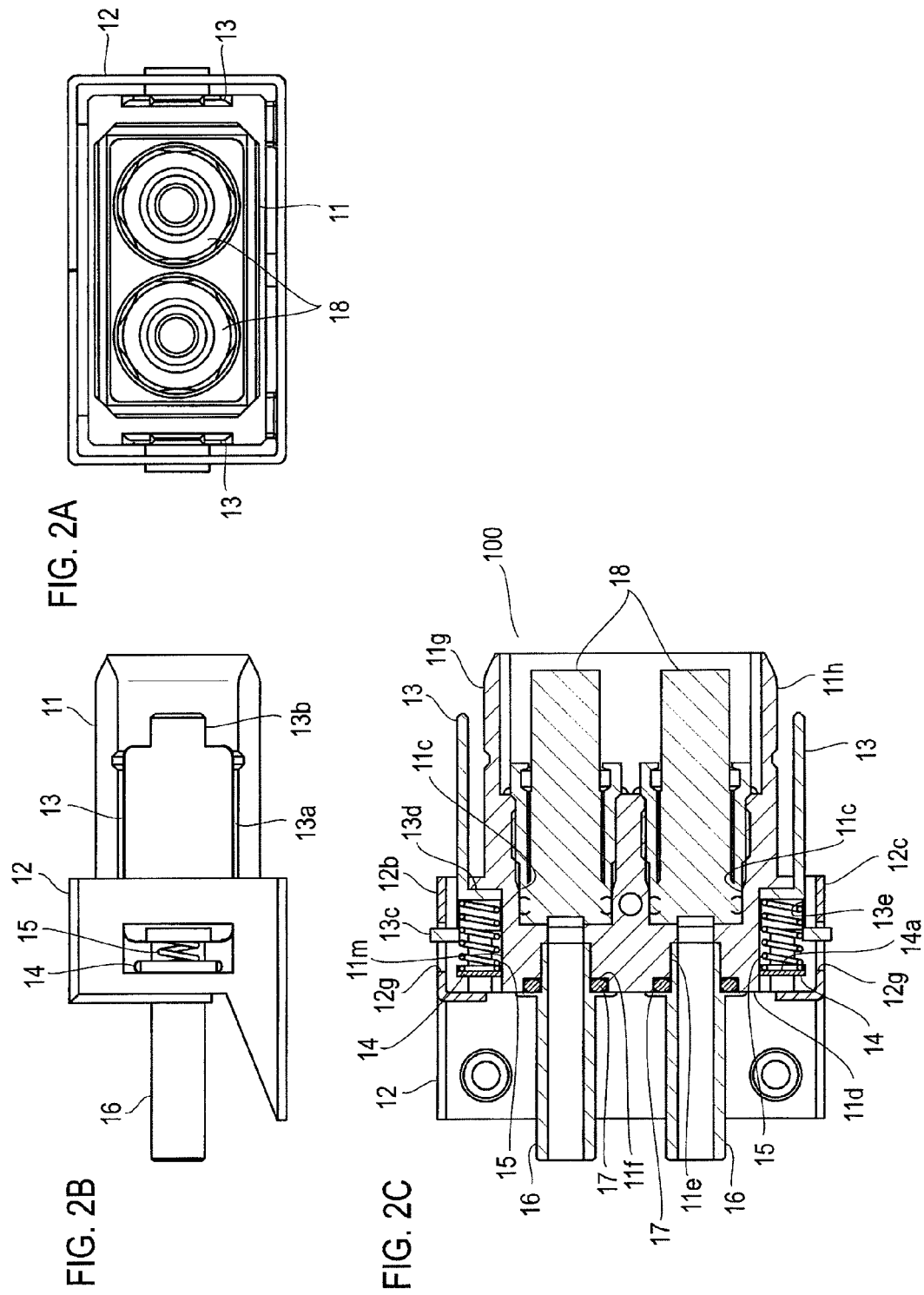

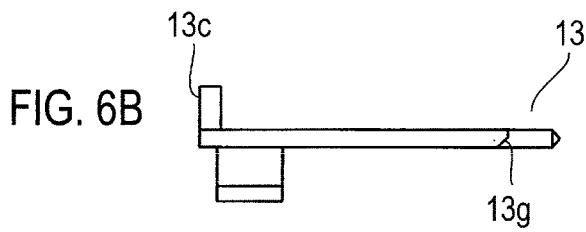
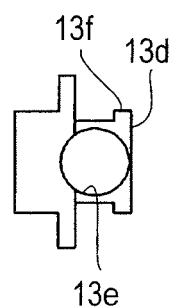
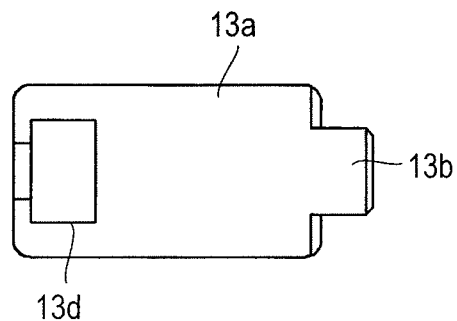
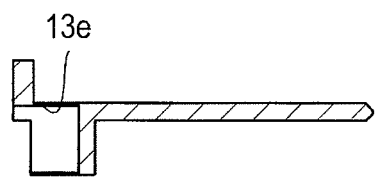
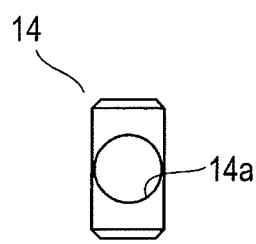
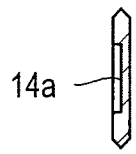

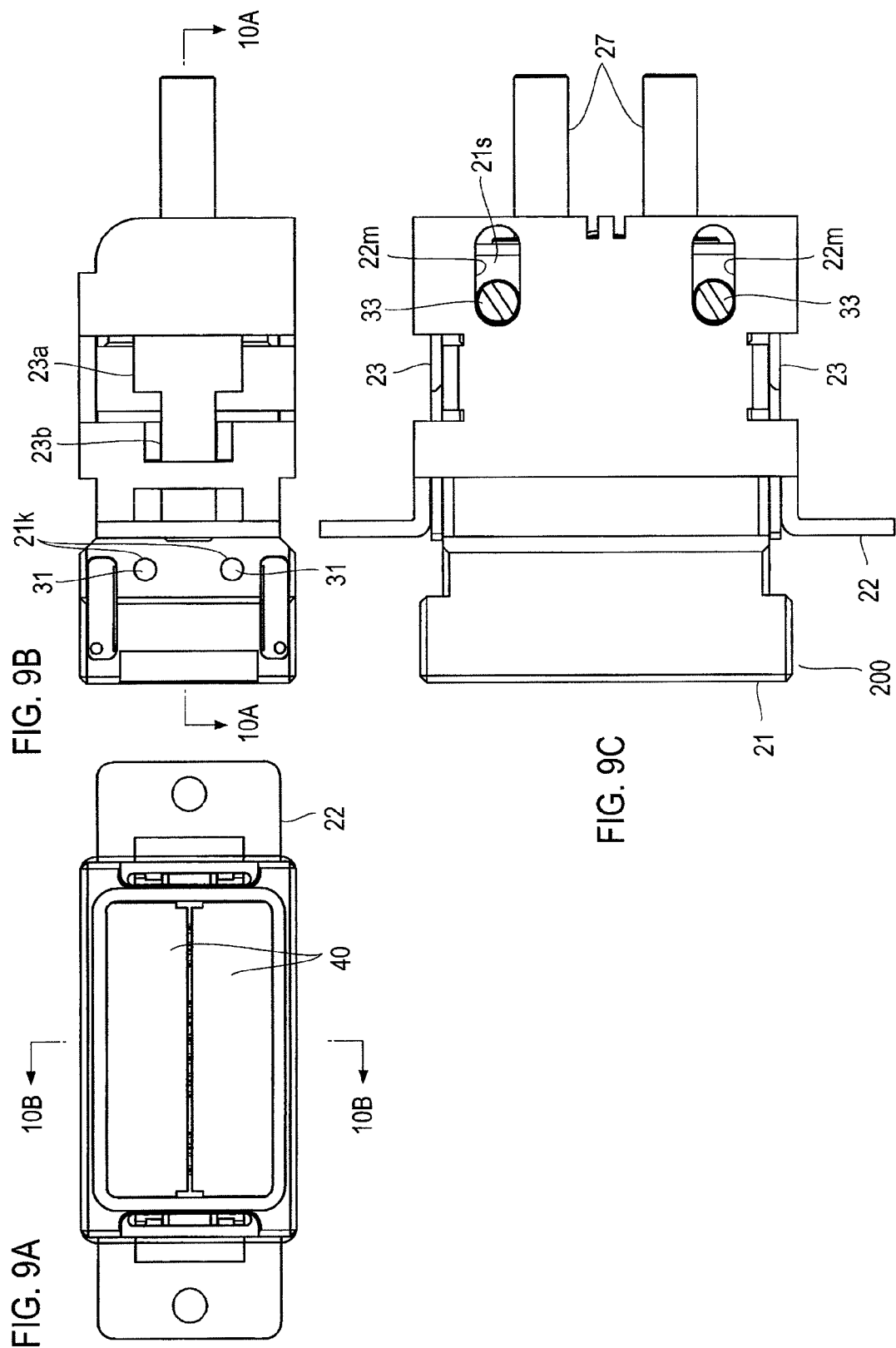

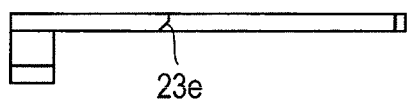
FIG. 15B
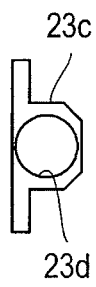
FIG. 15C
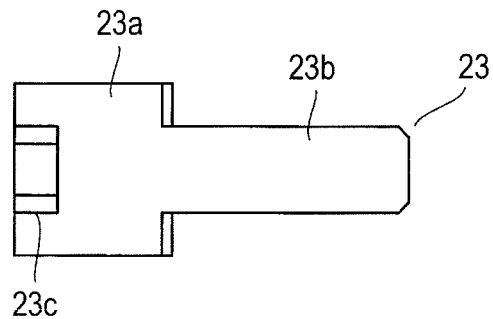
FIG. 15A
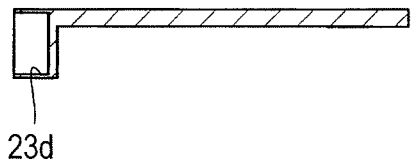
FIG. 15D
FIG. 16A     FIG. 16B
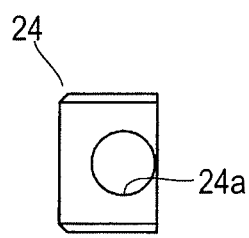
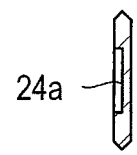

FLUID COUPLER DEVICE AND INTERFACE STRUCTURE OF DAUGHTERBOARD

TECHNICAL FIELD

The present invention relates to a fluid coupler device including a plug that receives one of a male member and a female member each of which is to be attached to an end of a pipe through which a fluid flows and a receptacle that receives the other for interconnecting the pipes and to an interface structure of a daughterboard including the plug of the fluid coupler device.

BACKGROUND ART

High-heat-producing devices need to be cooled to reduce a temperature rise and the use of a water-cooling system is generally desirable because of the cooling performance.

Optical communication devices that enable high-capacity long-distance transmission (packet optical transport systems) are being actively developed and high heat production is becoming a problem in these optical communication devices as well. To cool an optical communication device with water, optical interconnections and cooling-water piping need to be installed.

Fluid couplers capable of interconnecting pipes simply and quickly are widely used for installing cooling water piping. Such a fluid coupler requires a press force of as large as 30 N (approximately 3 kgf), for example, for connecting operation (see "CGO/CGD" catalogues, Staubli Corporation, Apr. 5, 2011, for example).

Since an optical connector cannot withstand a force of as large as 30 N, a system in which an optical connector and a fluid coupler are mounted on the same daughterboard, for example, and are collectively connected to a backboard cannot be employed. Accordingly, most of the conventional optical communication devices use an air-cooling system. To employ a water-cooling system, cooling-water piping needs to be installed separately from optical interconnections and a fluid coupler and an optical connector need to be connected separately.

SUMMARY OF THE INVENTION

As has been described above, conventional optical communication devices cannot employ a system in which an optical connector and a fluid coupler are mounted on the same daughterboard and are collectively connected to a backboard. The optical connector and the fluid coupler need to be separately connected, which is inefficient and inconvenient.

An object of the present invention is to provide a fluid coupler device capable of being installed together with and connected in combination with a connector, for example an optical connector, that cannot withstand a large press force, and to provide an interface structure of a daughterboard including such a fluid coupler device.

The present invention provides a fluid coupler device including a plug receiving one of a male member attached to an end of a pipe and a female member attached to an end of a pipe and a receptacle receiving the other of the male member and the female member for coupling the pipes through which a fluid flows. The receptacle includes a receptacle-side slider including a floating mechanism capable of moving backward in the direction opposite to a direction in which the plug is to be connected and being pressed by a receptacle-side spring in the direction in which the plug is to be connected, a first lock mechanism functioning to couple and fix the receptacle to the plug, and a second lock mechanism functioning to prevent the backward movement of the floating mechanism. The plug includes a plug-side slider being pressed by a plug-side spring having a press force than the receptacle-side spring in the direction in which the receptacle is to be connected and an indentation in which the first lock mechanism fits. When the plug is inserted into the receptacle, the plug-side slider hits against the first lock mechanism and is prevented from moving forward, the plug-side spring is compressed to move only the plug forward. When connection between the male member and the female member is complete, the first lock mechanism fits into the indentation and the prevention is removed to move the plug-side slider forward. The forward movement of the plug-side slider places the first lock mechanism in a lock state to couple and fix the plug to the receptacle and the plug-side slider pushes the receptacle-side slider to cause the receptacle-side slider to move backward. The backward movement of the receptacle-side slider unlocks the second lock mechanism to cause the floating mechanism to move the receptacle backward.

A fluid coupler device according to the present invention is configured so that after a plug and a receptacle have been coupled together and connection between a male member and a female member has been completed, a floating mechanism moves the receptacle backward. The backward movement can be used to connect another connector or the like and therefore can be installed together with a connector, such as an optical connector, for example, that cannot withstand a large press force and can be connected in combination with such a connector. Thus, the present invention can provide a convenient fluid coupler device that can significantly improve working efficiency.

BRIEF DESCRIPTION OF THE DRAWINGS

FIG. 2A is a front view of the plug illustrated in FIG. 1A.

FIG. 2B is a side view of the plug illustrated in FIG. 1A.

FIG. 2C is a cross-sectional view of the plug illustrated in FIG. 1A.

FIG. 6A is a front view of a plug-side slider of the plug illustrated in FIG. 1A.

FIG. 6B is a plan view of the plug-side slider illustrated in FIG. 6A.

FIG. 6C is a side view of the plug-side slider illustrated in FIG. 6A.

FIG. 6D is a cross-sectional view of the plug-side slider illustrated in FIG. 6A.

FIG. 7A is a front view of a plate of the plug illustrated in FIG. 1A.

FIG. 7B is a cross-sectional view of the plate illustrated in FIG. 7A.

FIG. 9A is a front view of the receptacle illustrated in FIG. 8A.

FIG. 9B is a side view of the receptacle illustrated in FIG. 8A.

FIG. 9C is a bottom view of the receptacle illustrated in FIG. 8A.

FIG. 15A is a front view of a receptacle-side slider of the receptacle illustrated in FIG. 8A.

FIG. 15B is a plan view of the receptacle-side slider illustrated in FIG. 15A.

FIG. 15C is a side view of the receptacle-side slider illustrated in FIG. 15A.

FIG. 15D is a cross-sectional view of the receptacle-side slider illustrated in FIG. 15A.

FIG. 16A is a front view of a plate of the receptacle illustrated in FIG. 8A.

FIG. 16B is a cross-sectional view of the plate illustrated in FIG. 16A.

DETAILED DESCRIPTION OF THE EMBODIMENTS

Figure 1A:
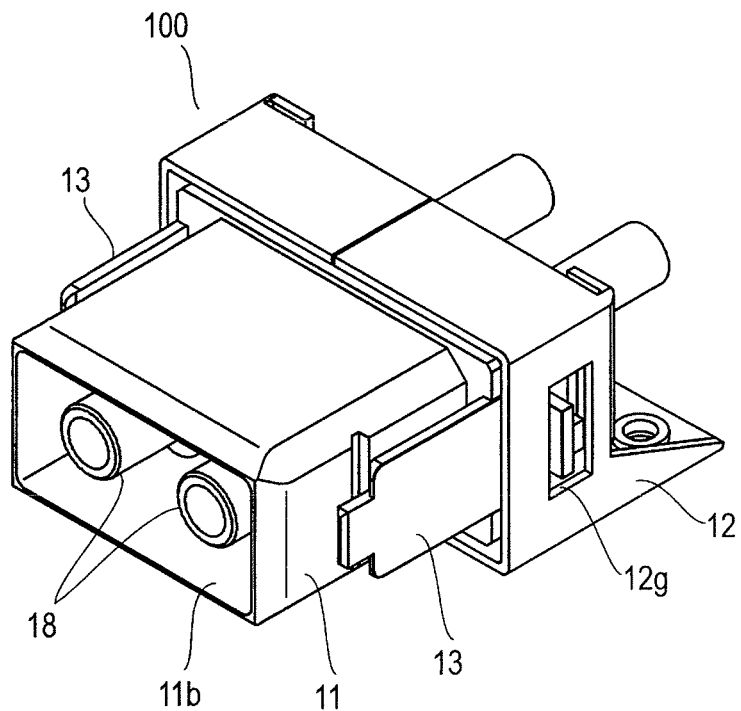
FIG. 1A is a front perspective view of a plug in a first embodiment of a fluid coupler device according to the present invention.
Figure 1B:
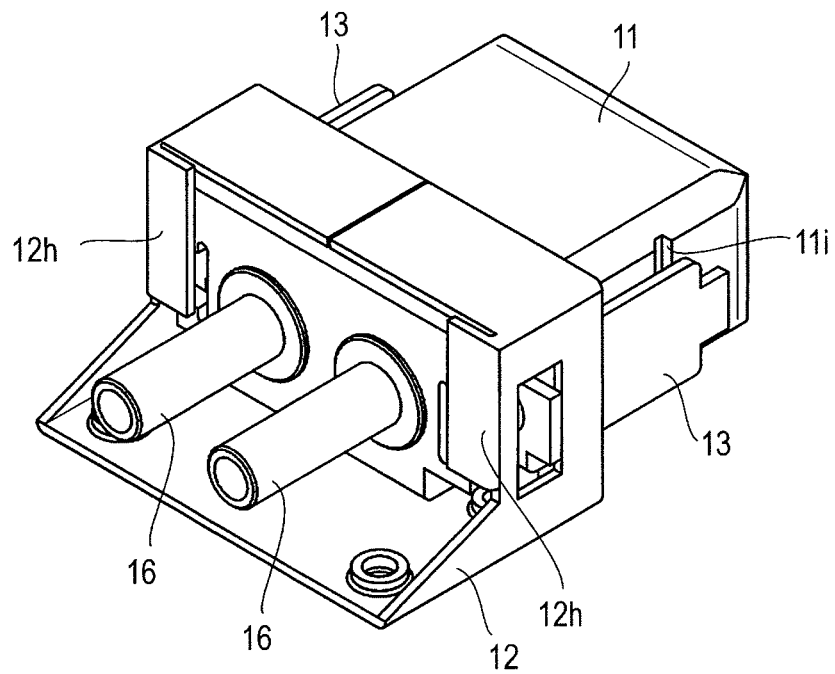
FIG. 1B is a rear perspective view of the plug illustrated in FIG. 1A.
Figure 3A:
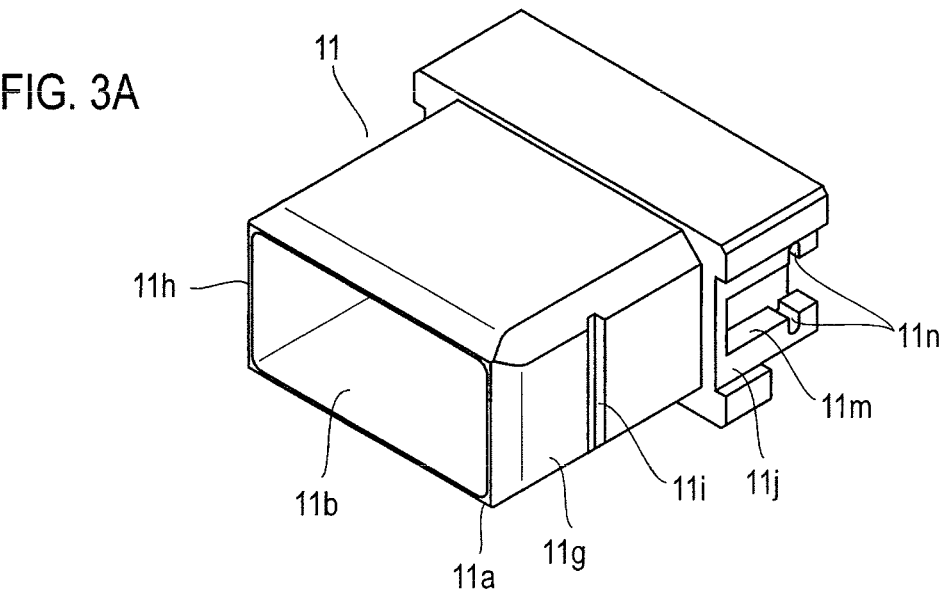
FIG. 3A is a front perspective view of a housing of the plug illustrated in FIG. 1A.
Figure 3B:
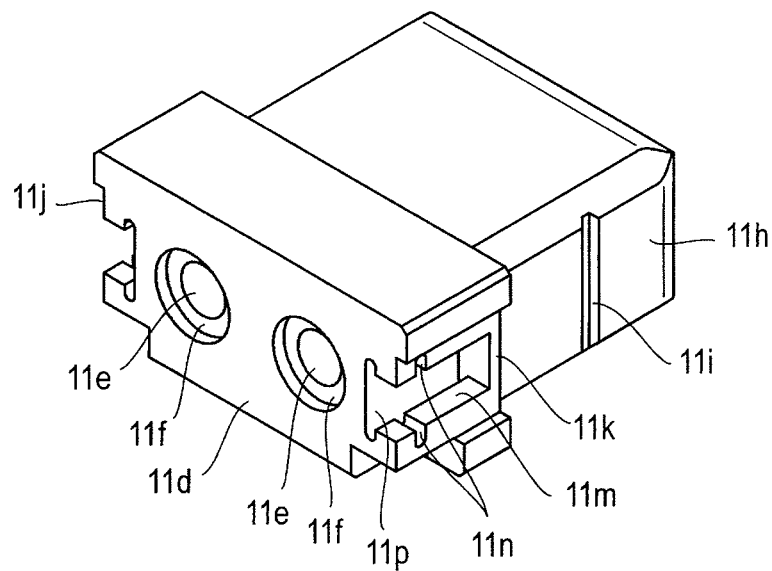
FIG. 3B is a rear perspective view of the housing illustrated in FIG. 3A.
Figure 4A:
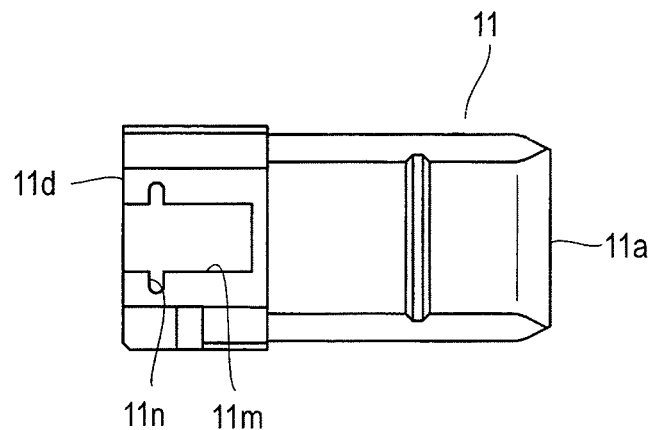
FIG. 4A is a side view of the housing illustrated in FIG. 3A.
Figure 4B:
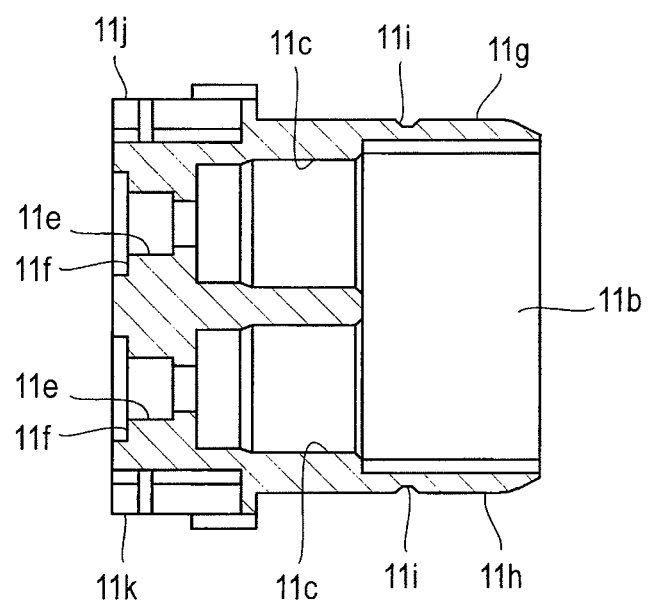
FIG. 4B is a cross-sectional view of the housing illustrated in FIG. 3A.

Embodiments of the present invention will be described below.

First Embodiment

FIGS. 1A, 1B and 2A to 2C illustrate a configuration of a plug in a first embodiment of a fluid coupler device according to the present invention. FIGS. 3A, 3B, 4A, 4B, 5A, 5B, 6A to 6D, 7A and 7B illustrate components of the fluid coupler device (some components are omitted from the drawings). The plug 100 in this example includes a housing 11, a bracket 12, two plug-side sliders 13, two plates 14, two plug-side springs 15, two pipes 16, two O-rings 17, and two male members 18.

The housing 11 has the shape of a generally rectangular solid block as illustrated in FIGS. 3A, 3B, 4A and 4B and has a rectangular opening 11b which is formed in the front face 11a and substantially occupies the front face 11a. Two receiving holes 11c that communicate with the opening 11b and receive the male members 18 are formed in the housing 11. The receiving holes 11c are followed by holes 11e that open at the rear face 11d of the housing 11. A recess 11f in which an O-ring 17 is to be placed is formed at an open end of each of the holes 11e.

An indentation 11i that vertically extends is formed in the outer surface of each of sidewalls 11g and 11h near the front of the housing 11. The indentation 11i has a trapezoidal cross-sectional shape tapered toward the bottom.

The outer shape of the housing 11 is larger at the rear part than the front part and a recess 11m that reaches the rear face 11d is formed in each of the sidewalls 11j and 11k. Grooves 11n are formed in the recesses 11m near the rear face 11d so as to vertically extend from the recesses 11m. The bottom of each recess 11m is vertically widened to provide a wide part 11p.

Figure 5A:
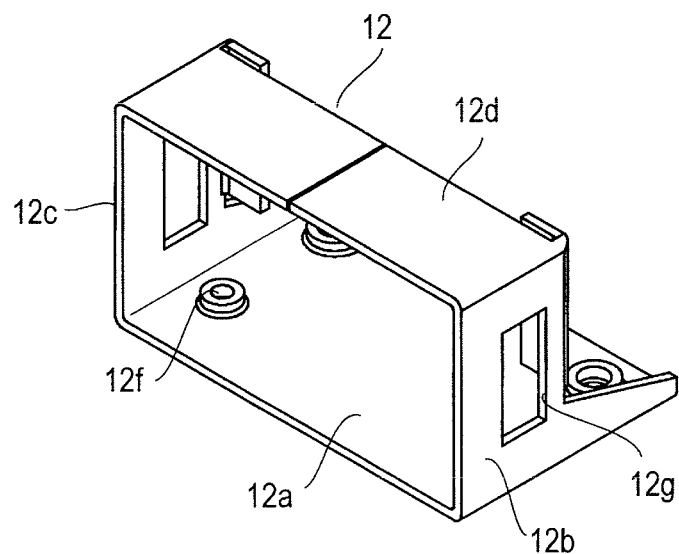
FIG. 5A is a front perspective view of a bracket of the plug illustrated in FIG. 1A.
Figure 5B:
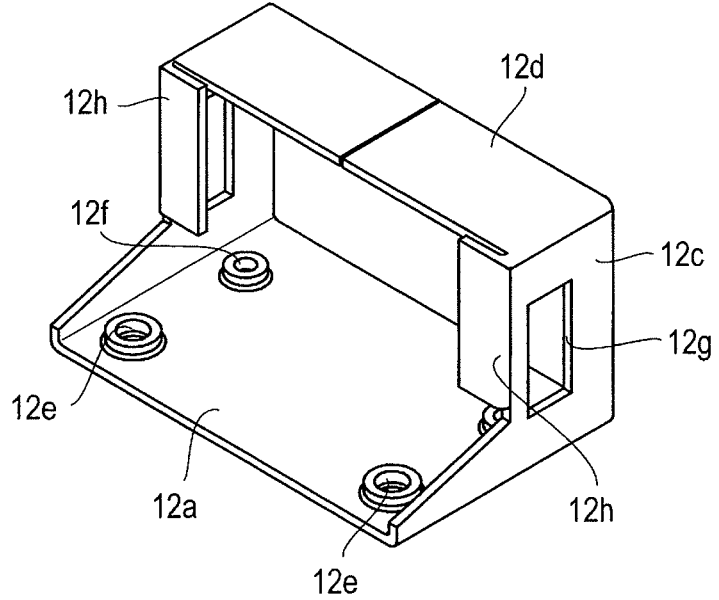
FIG. 5B is a rear perspective view of the bracket illustrated in FIG. 5A.
Figure 8A:
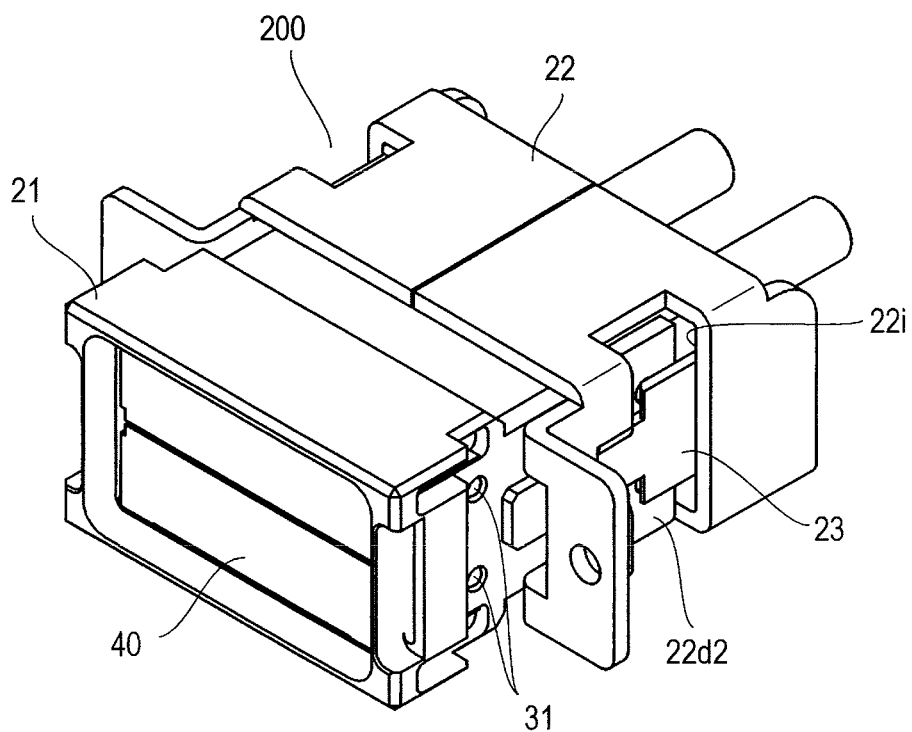
FIG. 8A is a front perspective view of a receptacle in the first embodiment of a fluid coupler device according to the present invention.
Figure 8B:
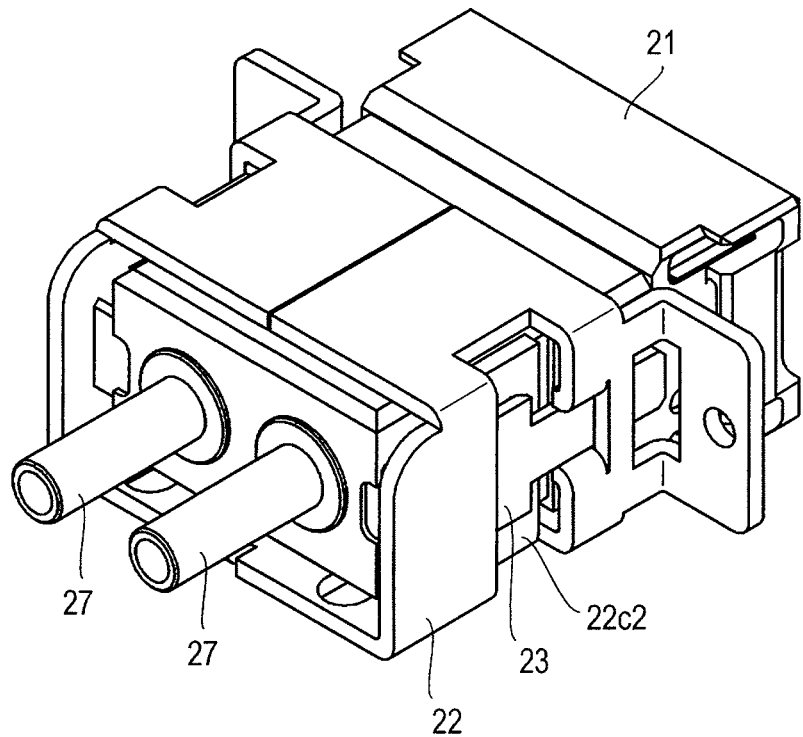
FIG. 8B is a rear perspective view of the receptacle illustrated in FIG. 8A.
Figure 10A:
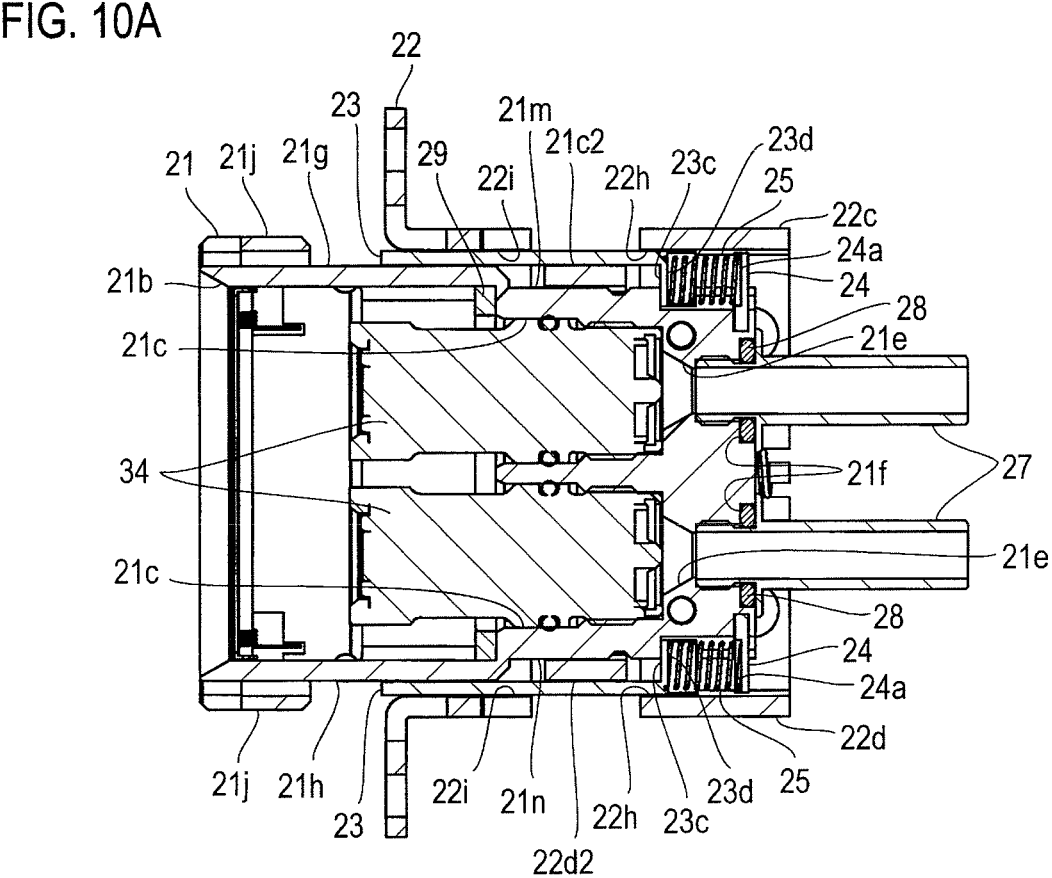
FIG. 10A is a cross-sectional view taken along line 10A-10A of FIG. 9B.
Figure 10B:
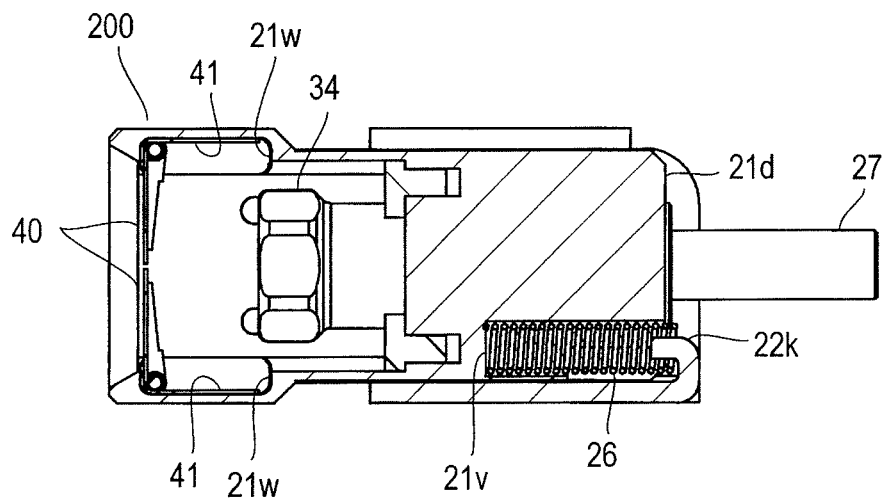
FIG. 10B is a cross-sectional view taken along line 10B-10B of FIG. 9A.
Figure 11A:
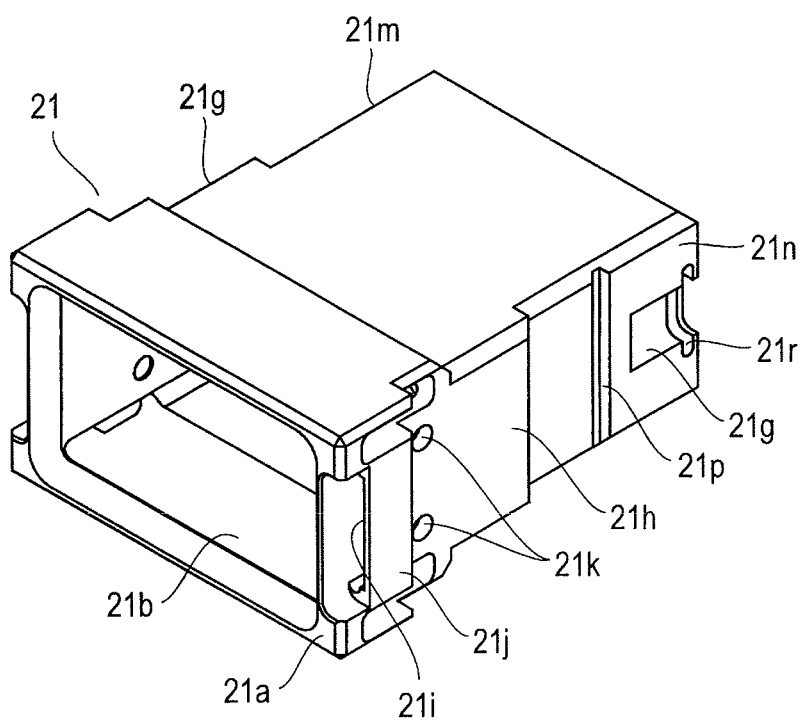
FIG. 11A is a front perspective view of a housing of the receptacle illustrated in FIG. 8A.
Figure 11B:
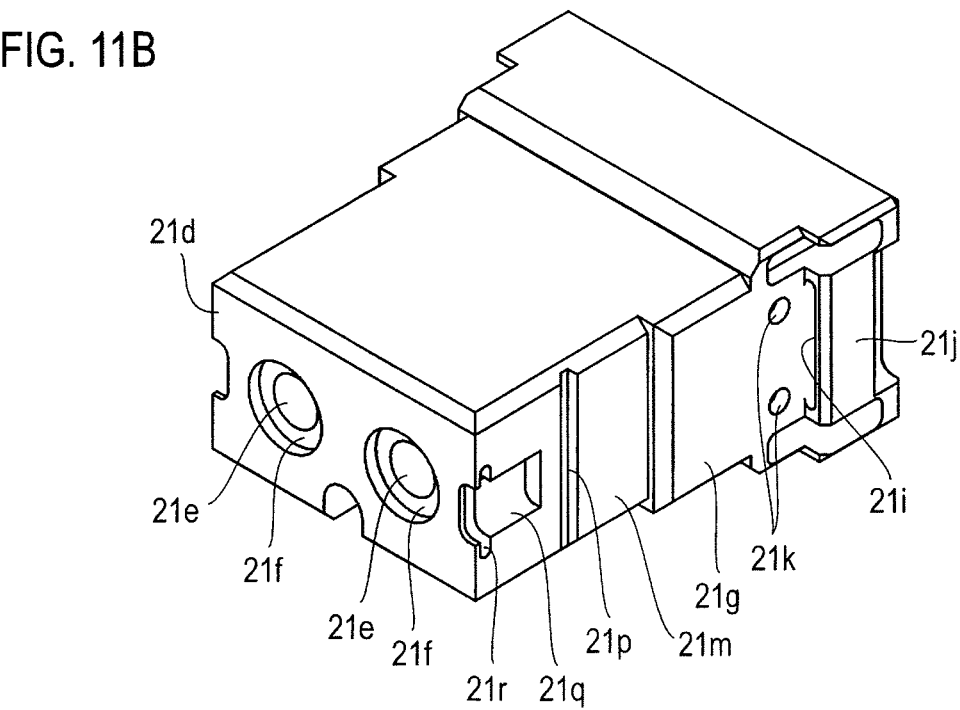
FIG. 11B is a rear perspective view of the housing illustrated in FIG. 11A.
Figure 12B:
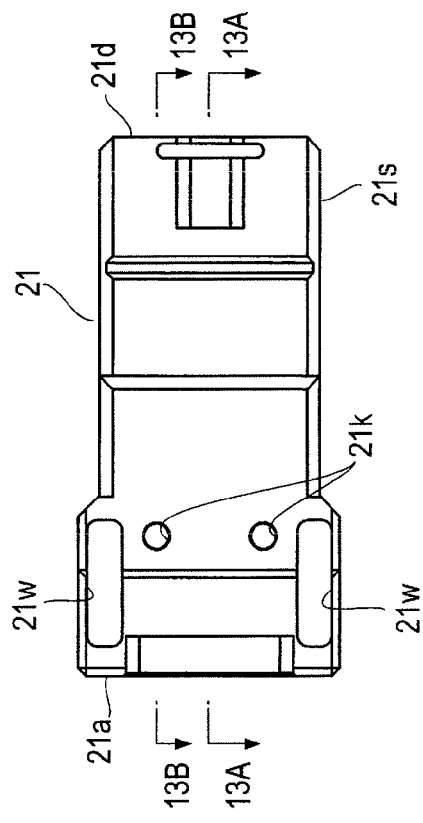
FIG. 12B is a side view of the housing illustrated in FIG. 11A.
Figure 12A:
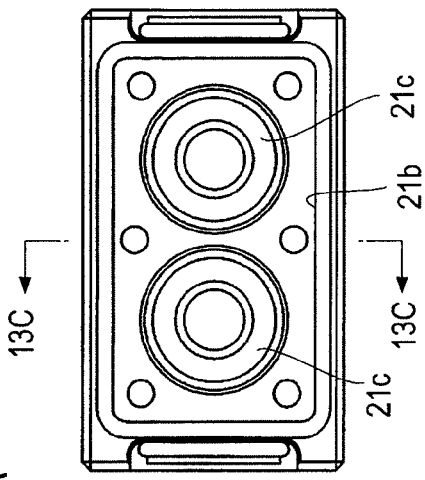
FIG. 12A is a front view of the housing illustrated in FIG. 11A.
Figure 12C:
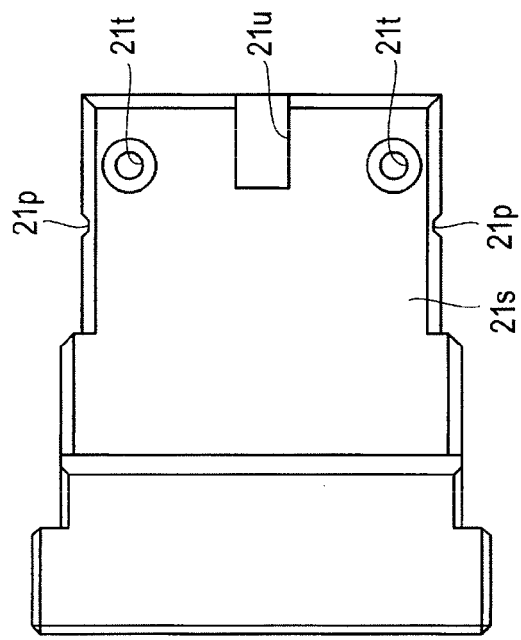
FIG. 12C is a bottom view of the housing illustrated in FIG. 11A.
Figure 13A:
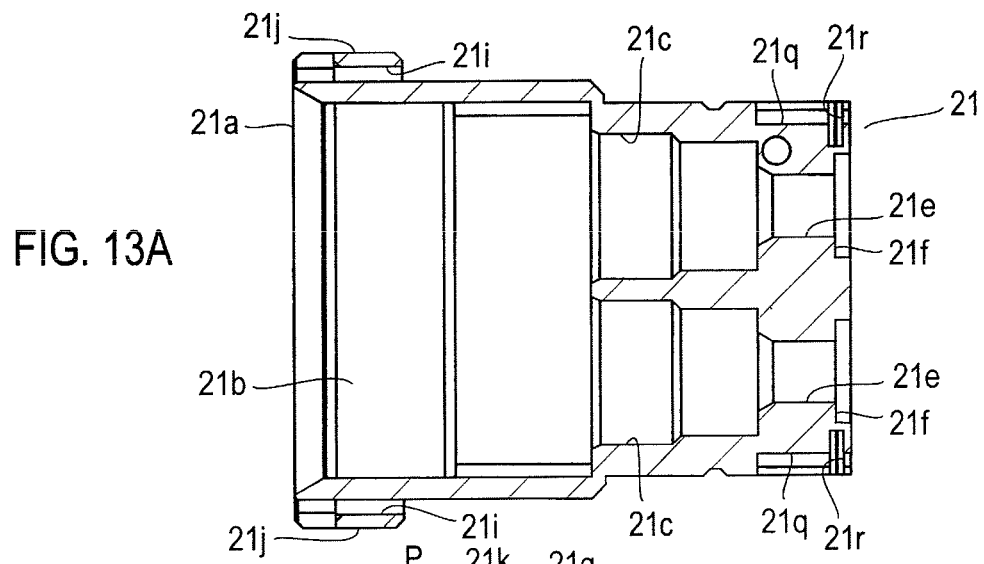
FIG. 13A is a cross-sectional view taken along line 13A-13A of FIG. 12B.
Figure 13B:
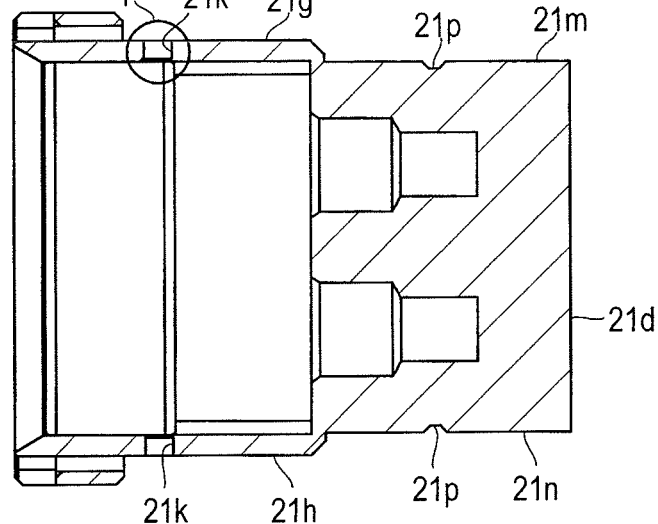
FIG. 13B is a cross sectional view taken along line 13B-13B of FIG. 12B.
Figure 13C:
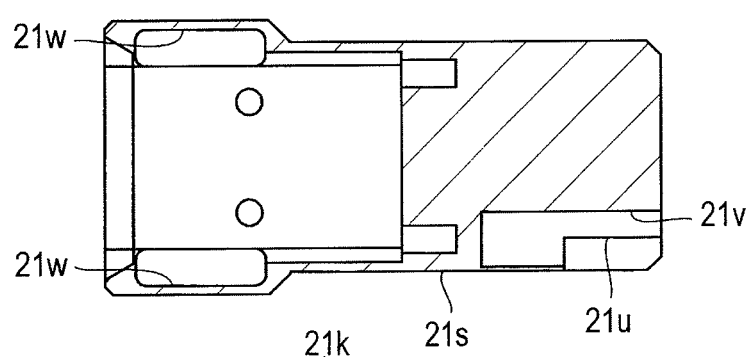
FIG. 13C is a cross-sectional view taken along line 13C-13C of FIG. 12A.
Figure 13D:
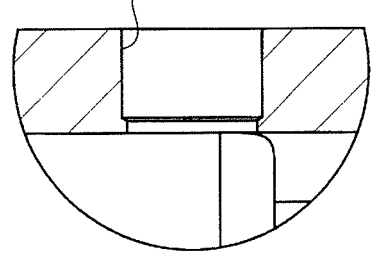
FIG. 13D is an enlarged view of part P of FIG. 13B.
Figure 14A:
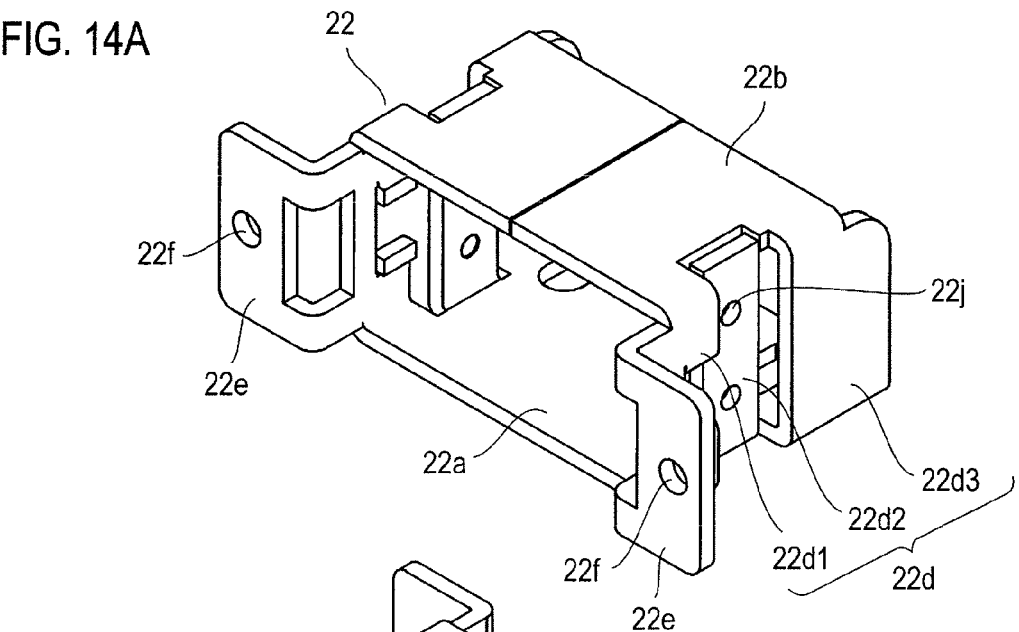
FIG. 14A is a front perspective view of a bracket of the receptacle illustrated in FIG. 8A.
Figure 14B:
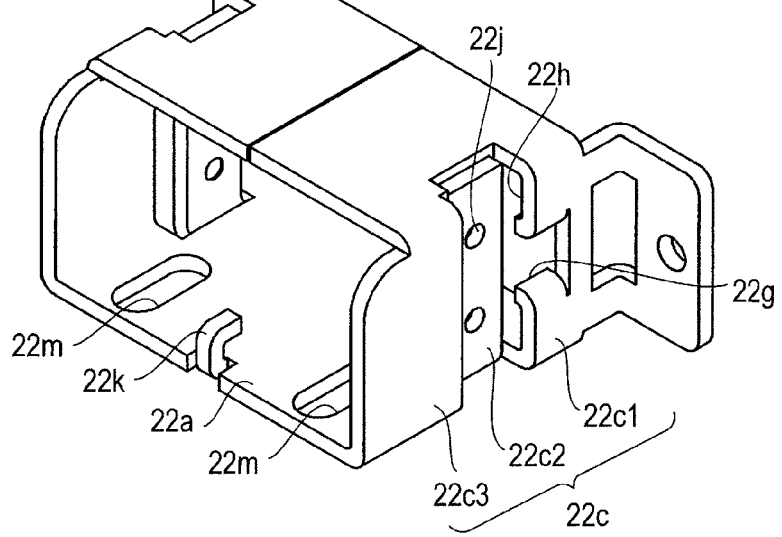
FIG. 14B is a rear perspective view of the bracket illustrated in FIG. 14A.
Figure 14D:
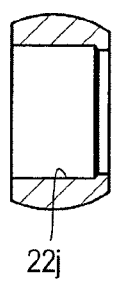
FIG. 14D is an enlarged view of part Q of FIG. 14C.
Figure 14C:
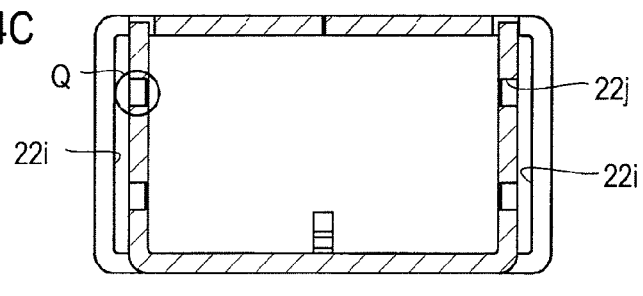
FIG. 14C is a cross-sectional view of the bracket illustrated in FIG. 14A.

The bracket 12 is formed of a metal plate folded into a frame as illustrated in FIGS. 5A and 5B and has a bottom plate part 12a, side plate parts 12b and 12c and an upper plate part 12d. The bottom plate part 12a is larger in area than the top plate part 12d and two large-diameter threaded holes 12e and two small-diameter threaded holes 12f are formed in the bottom plate part 12a by burring. The threaded holes 12e and 12f are used for mounting the plug 100.

A rectangular window 12g is formed in each of side plates 12b and 12c and the rear ends of the side plate parts 12b and 12c are folded inward to form folded parts 12h so that the folded parts 12h are opposed to each other.

A plug-side slider 13 has a shape illustrated in FIGS. 6A to 6D and includes a generally rectangular flat plate part 13a, a narrow protruding part 13b extended and protruding from the front end of the flat plate part 13a, a narrow vertically protruding part 13c vertically protruding from the rear end of the flat plate part 13a, and a protrusion 13d protruding in the direction opposite to the direction in which the vertically protruding part 13c protrudes from the rear end side of the flat plate part 13a. A circular hole 13e opened in at the rear side is formed in the protrusion 13d and a wide part 13f protruding upward and downward is formed at the protruding end face of the protrusion 13d. The four edges at the front end of the protruding part 13b are chamfered into a tapered shape. A tapered surface 13g is formed at the front end of the flat plate part 13a on the side from which the protrusion 13d protrudes.

A plate 14 is rectangular as illustrated in FIGS. 7A and 7B and a circular recess 14a is formed in the center of the plate 14. The four edges of each of the upper and lower end of the plate 14 are chamfered into a sharp tip.

An assembly structure of the plug 100 will be described below.

Male members 18 of a fluid coupler are placed in and fixed to the two receiving holes 11c of the housing 11. The male members 18 in this example are fluid coupler CGO 03/C plugs on a catalogue of Staubli Corporation. Pipes 16 are aligned and attached to the two holes 11e at the rear face 11d of the housing 11. The pipes 16 and the male members 18 communicate with each other through the holes 11e. When the pipes 16 are attached, the O-ring 17 is positioned in each of the recesses 11f.

The plug-side sliders 13 are attached to the sidewalls 11j and 11k of the housing 11 with the protrusions 13d being inserted from the rear face 11d of the housing 11 into the recesses 11m of the housing 11. The wide parts 13f of the protrusions 13d are inserted and positioned in the wide parts 11p of the recesses 11m. The flat plate parts 13a and protruding parts 13b of the plug-side sliders 13 are positioned a predetermined distance away from the sidewalls 11g and 11h on the front side of the housing 11 and the protruding parts 13b are positioned so as to face the front of the housing 11.

The plates 14 are fitted into the grooves 11n of the sidewalls 11j and 11k of the housing 11 and each of pug-side springs 15, which are coil springs, is inserted between the plate 14 and the protrusion 13d of the plug-side slider 13. One end of the plug-side spring 15 is positioned and aligned to the recess 14a of the plate 14 and the other end is placed in and aligned to the hole 13e of the plug-side slider 13. The plug-side slider 13 is pressed by the plug-side spring 15 toward the front of the housing 11 (in the direction in which the plug is connected to a receptacle).

The bracket 12 is placed around the housing 11 so that the bracket 12 encloses the rear part of the housing 11 where the outer shape is large. The vertically protruding parts 13c of the plug-side sliders 13 are positioned at the windows 12g of the side plate parts 12b and 12c of the bracket 12 and protrude outside the side plate parts 12b and 12c.

In the configuration described above, the housing 11 and the pipes 16 are made of an aluminum alloy, for example, and the bracket 12, the plug-side sliders 13, the plates 14 and the plug-side springs 15 are made of stainless steel, for example. The housing 11 is plated with nickel.

A configuration of a receptacle 200 to be engaged with the plug 100 described above will be described below.

FIGS. 8A, 8B, 9A to 9C, 10A and 10B illustrate a configuration of the receptacle 200; FIGS. 11A, 11B, 12A to 12C, 13A to 13D, 14A to 14D, 15A to 15D, 16A, 16B and 17 illustrate components (some components are omitted from the drawings) of the receptacle 200. The receptacle 200 in this example includes a housing 21, a bracket 22, two receptacle-side sliders 23, two plates 24, two receptacle-side springs 25, a spring 26, two pipes 27, two O-rings 28, a gasket 20, four first balls 31, four second balls 32, two screws 33, two female members 34, and a pair of shutter mechanisms 40 for protecting against dust.

The housing 21 has the shape of a generally rectangular solid block as illustrated in FIGS. 11A, 11B, 12A to 12C and 13A to 13D and has a rectangular opening 21b which is formed in the front face 21a and substantially occupies the front face 21a. Two receiving holes 21c that communicate with the opening 21b and receive the female members 34 are formed in the housing 21. The receiving holes 21c are followed by holes 21e that open at the rear face 21d of the housing 21. A recess 21f in which an O-ring 28 is to be placed is formed at an open end of each of the holes 21e.

The outer shape of the housing 21 is larger at the front face 21a side than at the rear face 21d side and a protruding part 21j is formed at the outer surface of sidewalls 21g and 21h of this part in such a manner that a vertically elongated gap 21i is formed between the sidewall 21g, 21h and the protruding part 21j. Two holes 21k, one above the other, are bored through each of the sidewalls 21g and 21h in a location further back from the protruding part 21j. As depicted in an enlarged view in FIG. 13D, an inner side part of each of the holes 21k is slightly smaller in diameter.

An indentation 21p that vertically extends is formed in each of sidewalls 21m and 21n near the rear face 21d of the housing 21. The indentation 21p has a trapezoidal cross-sectional shape tapered toward the bottom. A recess 21q that reaches the rear face 21d is formed in each of the sidewalls 21m and 21n nearer to the rear face 21d than the indentation 21p and a groove 21r is formed in the recess 21q in a location near the rear face 21d in such a manner that the groove 21r protrudes upward and downward from the recess 21q.

Two threaded holes 21t with counterbore are formed in the bottom surface 21s of the housing 21 in locations near the rear face 21d in such a manner that the threaded holes 21t are arranged in line in the width direction. A recess 21u that reaches the bottom surface 21s is formed in the center of the width of the bottom surface 21s. A circular hole 21v is formed in the rear face 21d in proximity to the bottom surface 21s. A part of the hole 21v is opened at the bottom surface 21s by the recess 21u.

The bracket 22 is formed of a metal plate folded into a frame as illustrated in FIGS. 14A to 14D and each of sidewalls 22c and 22d which connect a bottom plate part 22a with an upper plate part 22b is made up of three parts: a front part 22c1, 22d1, an intermediate part 22c2, 22d2, and rear part 22c3, 22d3. A mounting part 22e is formed by bending outward the front end of each of the front parts 22c1 and 22d1 and a mounting hole 22f is formed in each of the mounting parts 22e. The mounting holes 22f are used for mounting the receptacle 200. A notch 22g is formed in the center on the rear end side of each of the front parts 22c1 and 22d1 and the upper and lower edges of the notch 22g are bent inward.

The intermediate parts 22c2 and 22d2 are positioned more inward than the front part 22c1, 22d1 and the rear parts 22c3, 22d3 and therefore vertically elongated gaps 22h, 22i are formed between the intermediate parts 22c2, 22d2 and the front parts 22c1, 22d1 and between the intermediate parts 22c2, 22d2 and the rear parts 22c3, 22d3. Two holes 22j, one above the other, are formed in each of the intermediate parts 22c2 and 22d2. As depicted in an enlarged view in FIG. 14D, an inner-side part of the holes 22j is slightly smaller in diameter.

A hook 22k is formed by bending up a central portion of the rear end of the bottom plate part 22a and two oval holes 22m in line in the width direction are formed near the rear end.

Each of the receptacle-side sliders 23 has a shape as illustrated in FIGS. 15A to 15D and includes a rectangular flat plate part 23a, an elongated protruding part 23b extended and protruded from an end of the flat plate part 23a, and a protrusion 23c protruding from one of the plate surfaces in a location near the rear end of the flat plate part 23a. A circular hole 23d opened on the rear side is formed in the protrusion 23c. A tapered surface 23e is formed at the front end of the flat plate part 23a on the side from which the protrusion 23c protrudes.

Each plate 24 is rectangular as illustrated in FIGS. 16A and 16B and a circular recess 24a is formed in the plate surface. The upper and lower edges of the plate 24 are chamfered into a sharp tip.

Figure 17:
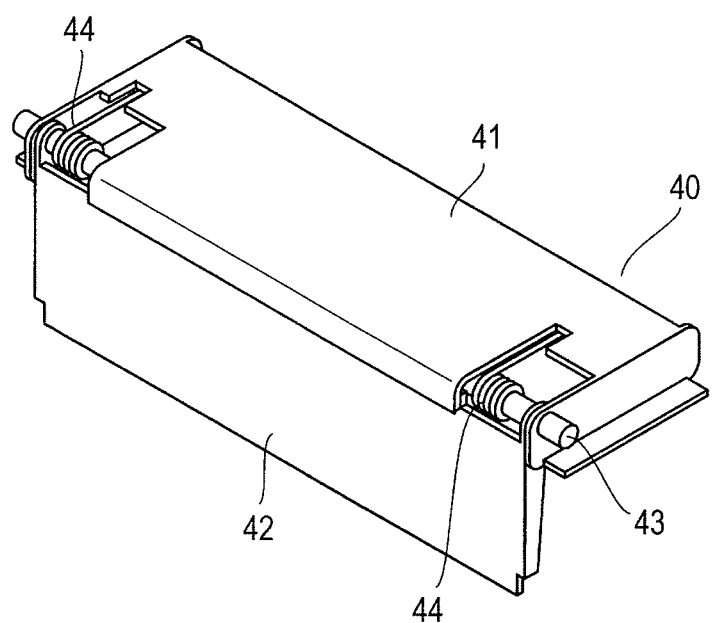
FIG. 17 is a perspective view of a shutter mechanism of the receptacle illustrated in FIG. 8A.

The shutter mechanism 40 has a configuration illustrated in FIG. 17. A fixed plate 41 and an openable plate 42 are connected together through a pin 43. A helical torsion coil spring 44 is attached at each end of the pin 43. When the front face of the openable plate 42 is pushed, the shutter opens. When the pressing force is removed, the openable plate 42 returns to the original position by the resilience of the helical torsion coil spring 44, and the shutter closes.

An assembly structure of the receptacle 200 will be described below.

Female members 34 of a fluid coupler are placed in and attached to the two receiving holes 21c of the housing 21. The female members 34 in this example are sockets of fluid coupler CGO 03/C on a catalogue of Staubli Corporation. A gasket 29 is disposed at the inner bottom of the opening 21b.

Pipes 27 are aligned and attached to the two holes 21e at the rear face 21d of the housing 21. The pipes 27 communicate with the female members 34 via the holes 21e. When the pipes 27 are attached, an O-ring 28 is placed in each of the recesses 21f. Screws 33 are driven into the two threaded holes 21t in the bottom surface 21s of the housing 21. The heads of the screws 33 are protruded from the bottom surface 21s.

The pair of shutter mechanisms 40 are attached to the housing 21 with both edge of the fixed plate 41 along the width direction being inserted and supported in long holes 21w bored, one above the other, in the protruding part 21j in sidewalls 21g and 21h of the housing 21.

The first balls 31 are inserted into the four holes 21k in the housing 21. After the first balls 31 have been inserted, each of the holes 21k is swaged at a plurality of positions along the circumference of each hole 21k. The swaging narrows the diameter of the hole 21k to allow the first ball 31 to be held in the hole 21k in such a manner that the first ball 31 can move in the direction in which the hole 21k is bored. The second balls 32 are inserted in the four holes 22j in the bracket 22. After the second balls 32 have been inserted, each of the holes 22j is swaged at a plurality of positions along the circumference of each hole 22j. The swaging narrows the diameter of the hole 22j to allow the second ball 32 to be held in the hole 22j in such a manner that the second ball 32 can move in the direction in which the hole 22j is bored.

The bracket 22 is disposed around the housing 21 so as to enclose the housing 21. In the disposition, the receptacle-side sliders 23, the plates 24 and the receptacle-side springs 25 are placed between the bracket 22 and the housing 21 and then the spring 26 is placed between them.

The spring 26 is a coil spring, one end of which is latched onto the hook 22k of the bracket 22 and the other end is inserted into the hole 21v in the housing 21. The housing 21 is pressed forward by the spring 26.

The protrusions 23c of the receptacle-side sliders 23 are positioned in the recesses 21q in the sidewalls 21m and 21n of the housing 21. The flat panel parts 23a of the receptacle-side sliders 23 pass through the gap 22i in the bracket 22 to the outside of the intermediate parts 22c2, 22d2 of the sidewalls 22c, 22d of the bracket 22. The protruding part 23b pass through the gap 22h in the bracket 22 and are positioned outside the sidewalls 21g, 21h of the housing 21, that is, positioned between the sidewalls 21g, 21h and the bracket 22. The protruding parts 23b are directed toward the front of the housing 21.

The plates 24 are fit into the grooves 21r in the sidewalls 21m and 21n of the housing 21 and the receptacle-side springs 25, which are coil springs, are inserted between the plates 24 and the protrusions 23c of the receptacle-side sliders 23. One end of each of the receptacle-side springs 25 is positioned in and aligned to the recess 24a in the plate 24 and the other end is placed in and aligned to the hole 23d in the receptacle-side slider 23. The receptacle-side sliders 23 are pressed forward of the housing 21 (in the direction in which the plug 100 is connected) by the receptacle-side springs 25. Note that the press force of the receptacle-side springs 25 is weaker than that of the plug-side springs 15.

In the configuration described above, the housing 21 and the pipes 27 are made of an aluminum alloy, for example, and the bracket 22, the receptacle-side sliders 23, the plates 24, the receptacle-side springs 25, the spring 26, the first and second balls 31, 32, the screws 33 and the components of the shutter mechanisms 40 are made of stainless steel, for example. The housing 21 is plated with nickel.

The receptacle 200 in this example includes a first lock mechanism including the first balls 31 held in the holes 21k in the sidewalls 21g and 21h of the housing 21 in such a manner that the first balls 31 can move in the direction perpendicular to the direction in which the plug 100 is connected. The first balls 31 of the first lock mechanism fit into the indentations 11i formed in the housing 11 of the plug 100 to provide coupling and fixing with the plug 100.

The receptacle 200 also includes a second lock mechanism including the indentations 21p provided in the sidewalls 21m and 21n of the housing 21 and the second balls 32 held by the intermediate parts 22c2 and 22d2 of the sidewalls 22c and 22d of the bracket 22 that are positioned outside the sidewalls 21m and 21n of the housing 21 in such a way that the second balls 32 can move in the direction perpendicular to the direction in which the plug 100 is connected. The second lock mechanism prevents the housing 21 from moving backward in the direction opposite to the direction in which the plug 100 is connected with respect to the bracket 22, that is, prevents the floating mechanism of the receptacle 200 from being activated.

Figure 18:
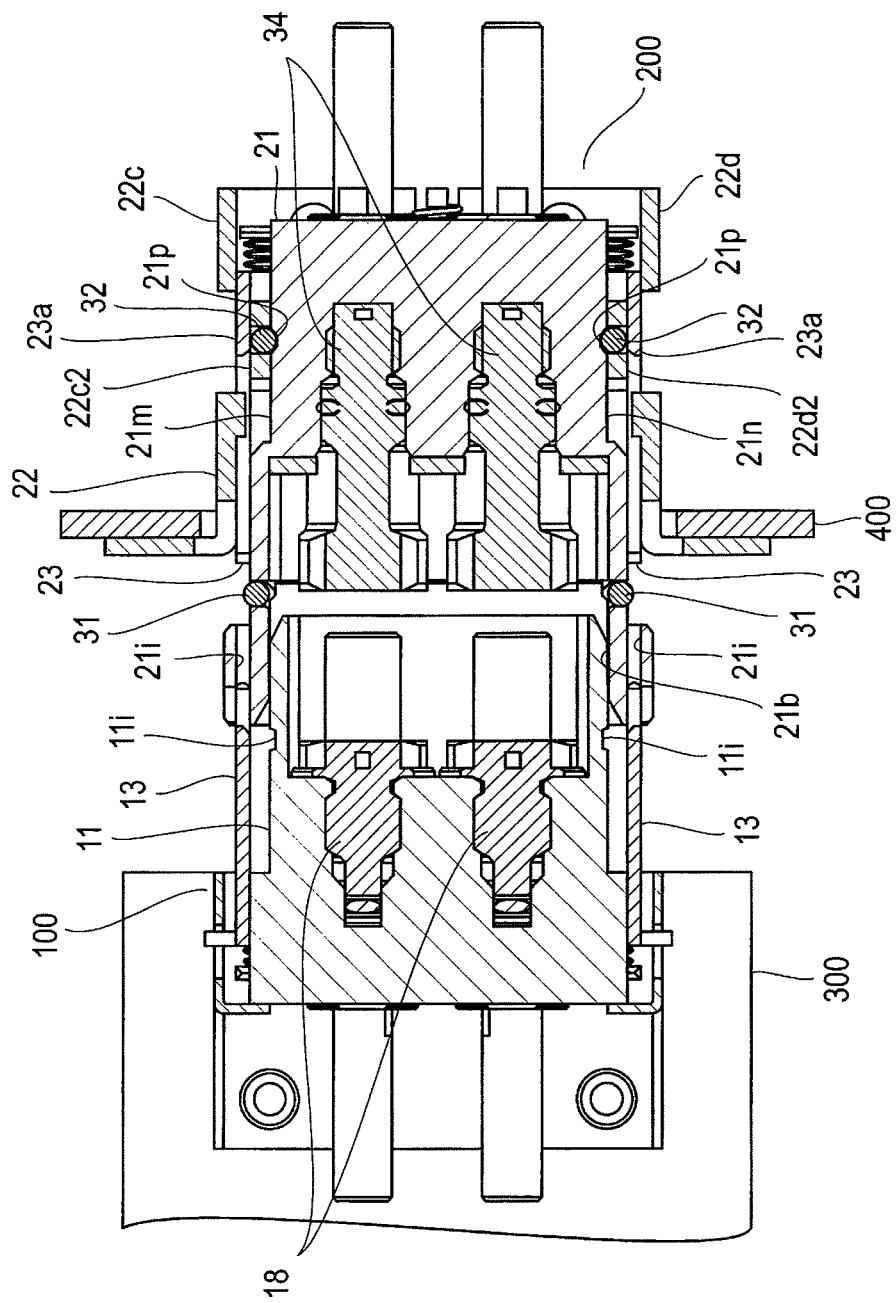
FIG. 18 is a diagram illustrating a fitting operation of the first embodiment of the fluid coupler device according to the present invention.
Figure 19:
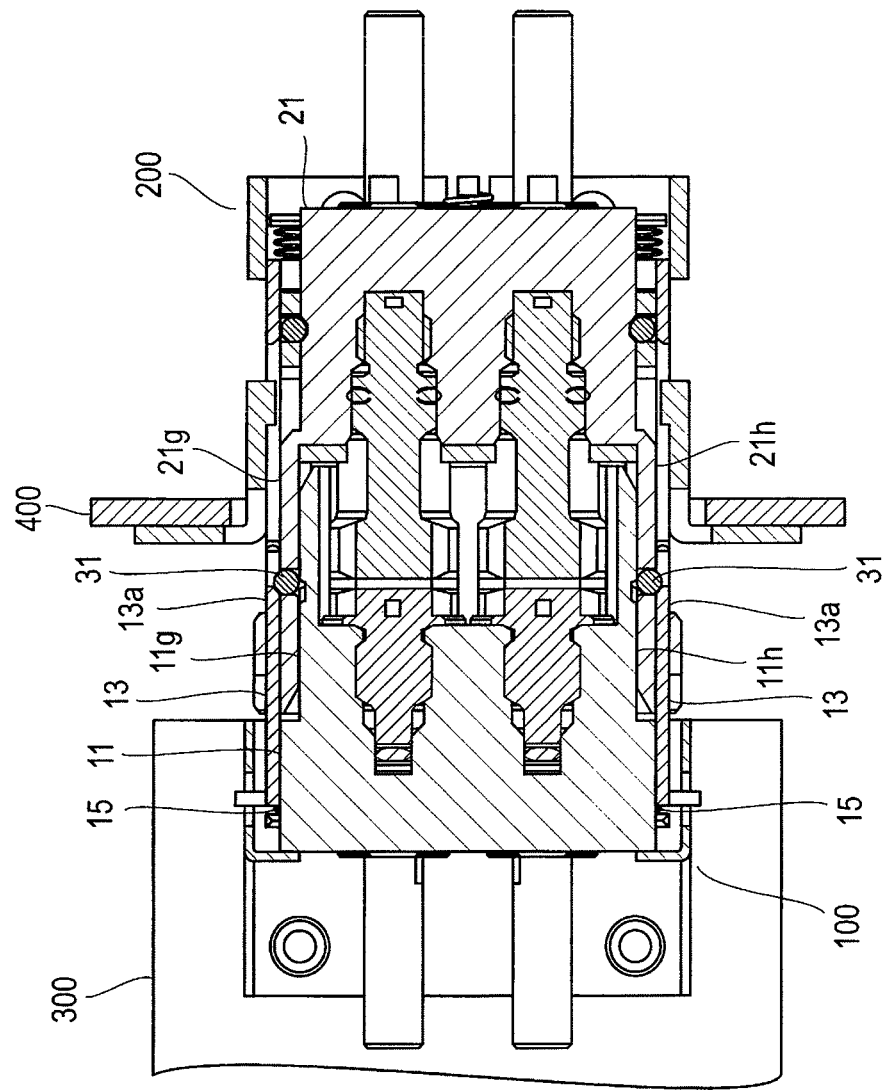
FIG. 19 is a diagram illustrating a fitting operation of the first embodiment of the fluid coupler device according to the present invention.
Figure 20:
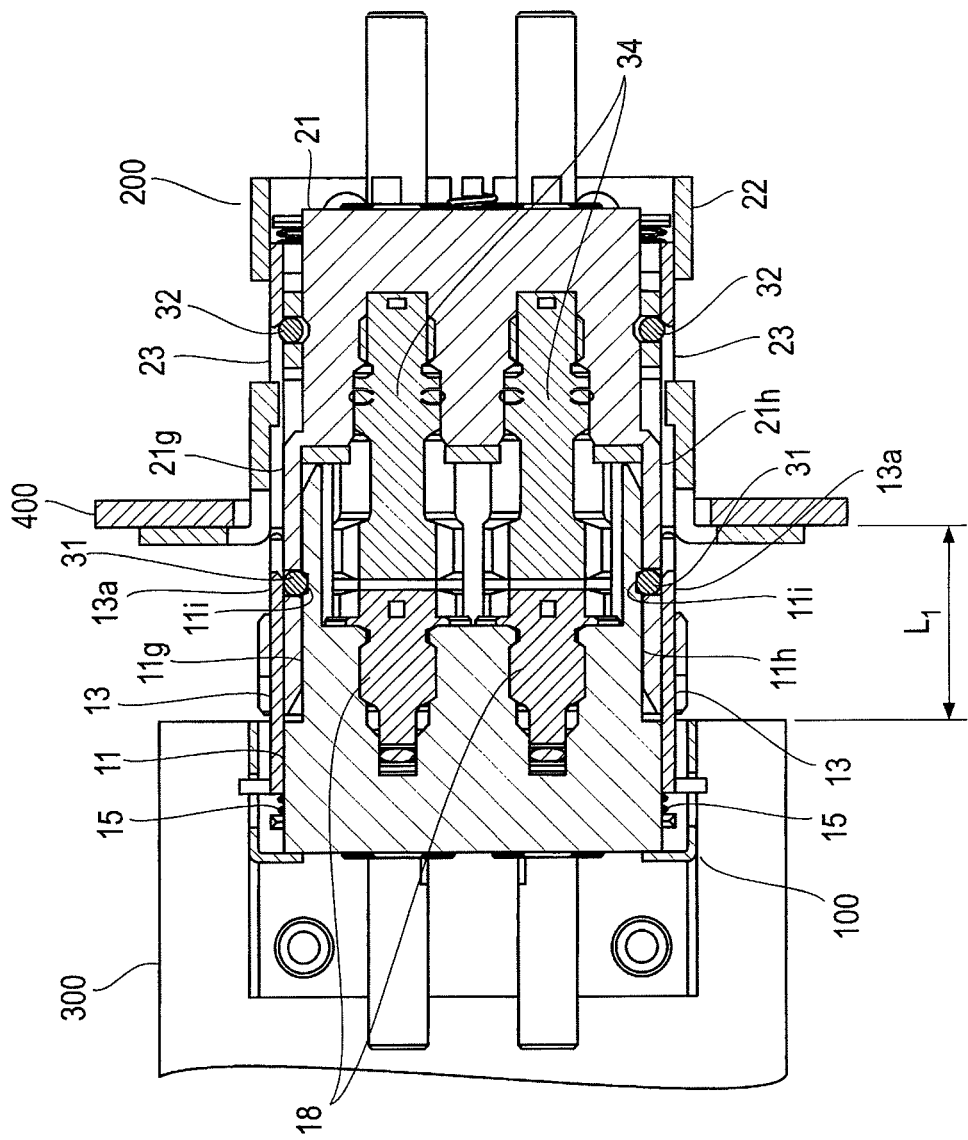
FIG. 20 is a diagram illustrating a fitting operation of the first embodiment of the fluid coupler device according to the present invention.

A fitting operation of a fluid coupler device including the plug 100 and the receptacle 200 described above will be described below step by step with reference to FIGS. 18 to 20. In FIGS. 18 to 20, the plug 100 is mounted on a daughterboard 300 and the receptacle 200 is mounted on a backboard 400. The daughterboard 300 is attached to the backboard 400 at right angles to the backboard 400.

(1) The receptacle 200 is in a state (the initial state) in which the second balls 32 are pressed by the flat panel parts 23a of the receptacle-side sliders 23 positioned outside the intermediate parts 22c2 and 22d2 of the sidewalls 22c and 22d of the bracket 22 so as to protrude on the inside of the intermediate parts 22c2 and 22d2 and are fit in the indentations 21p formed in the sidewalls 21m and 21n of the housing 21. This fixes the housing 21 to the bracket 22 and prevents the housing 21 from moving backward.

When the plug 100 is inserted into the receptacle 200, the housing 11 of the plug 100 is inserted into the opening 21b in the housing 21 of the receptacle 200 and the plug-side sliders 13 are inserted into the gaps 21i formed in the housing 21 (FIG. 18). By the insertion of the plug 100, the openable plate 42 of the shutter mechanism 40 is pushed open.

(2) The sidewalls 11g and 11h of the housing 11 of the plug 100 inserted on the inside of the sidewalls 21g and 21h of the housing 21 of the receptacle 200 push the first balls 31 so that the first balls 31 protrude on the outside of the sidewalls 21g and 21h. This causes the flat plate parts 13a of the plug-side sliders 13, which is being inserted on the outside of the sidewalls 21g and 21 h, to hit against the first balls 31 and prevented from moving further forward and compresses the plug-side springs 15 to move only the housing 11 of the plug 100 (FIG. 19).

(3) When the housing 11 of the plug 100 moves forward to complete connection between the male members 18 and the female members 34, the indentations 11i formed in the sidewalls 11g and 11h of the housing 11 of the plug 100 reach the location of the first balls 31. The first balls 31 are pushed by the flat plate parts 13a of the plug-side sliders 13 to protrude on the inside of the sidewalls 21g and 21h of the housing 21 and fit into the indentations 11i. This removes the prevention of the movement of the plug-side sliders 13 and the plug-side sliders 13 are pushed by the plug-side springs 15 to move forward.

(4) As the plug-side sliders 13 move forward, the first balls 31 are pressed inward by the flat plate parts 13a of the plug-side sliders 13. This places the first lock mechanism including the first balls 31 in the lock state to couple and fix the housing 11 of the plug 100 to the housing 21 of the receptacle 200. The plug-side sliders 13 hit against the receptacle-side sliders 23 and the receptacle-side sliders 23 are pushed by the plug-side sliders 13 to move backward (FIG. 20).

(5) Since the receptacle-side sliders 23 have moved back, the second balls 32 that were pressed by the receptacle-side sliders 23 inward are allowed to move outward, that is, the second balls 32 are allowed to protrude outside the bracket 22. This unlocks the second lock mechanism. The housing 21 of the receptacle 200 becomes able to move backward with respect to the bracket 22 and is placed in the floating state together with the housing 11 of the plug 100 to which the housing 21 is coupled.

Figure 21:
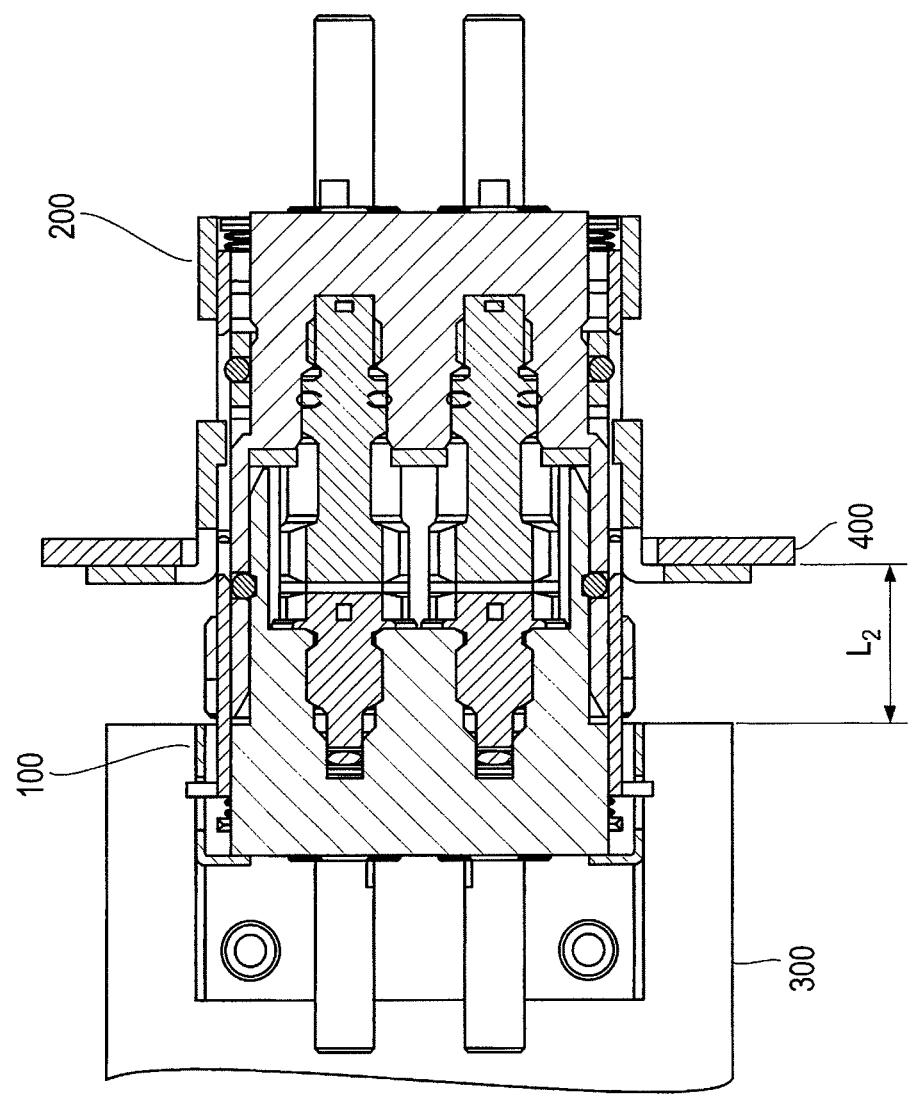
FIG. 21 is a diagram illustrating a floating state of the first embodiment of the fluid coupler device according to the present invention.
Figure 22:
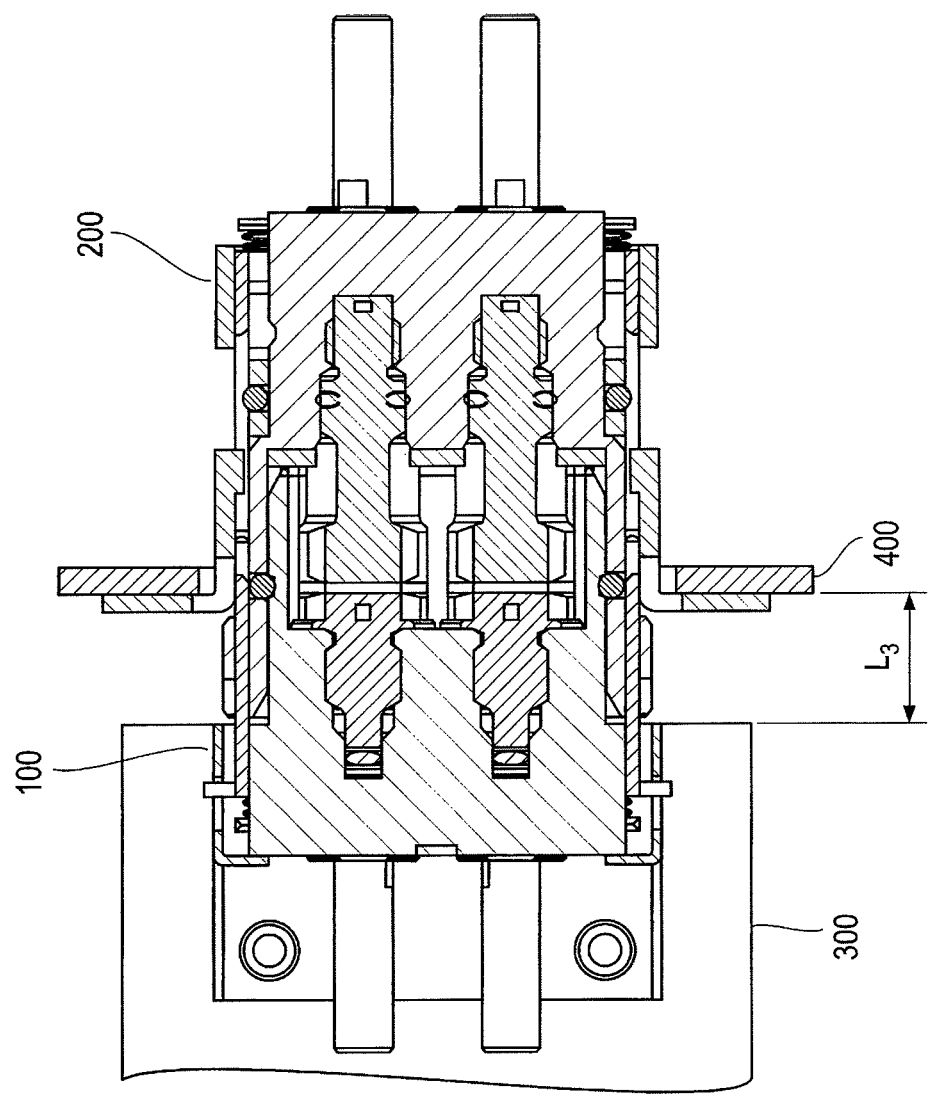
FIG. 22 is a diagram illustrating a floating state of the first embodiment of the fluid coupler device according to the present invention.

FIGS. 21 and 22 illustrate the plug 100 and the receptacle 200 in the floating state. FIG. 21 illustrates the plug 100 and the receptacle 200 positioned in the center of the range over which they can float. FIG. 22 illustrates the receptacle 200 that has moved backward to the limit.

The heads of the screws 33 attached to the bottom surface 21s of the housing 21 of the receptacle 200 are positioned in the oval holes 22m in the bracket 22. This defines the amount of floating. Specifically, the amount of floating is the amount that the heads of the screws 33 can move backward and forward in the oval holes 22m.

The result of the floating described above is that the distance between the plate surface of the backboard 400 and the front face of the daughterboard 300 (the distance between the boards) changes from $L_1$ to $L_2$ to $L_3$ as illustrated in FIGS. 20 to 22, respectively. Here, $L_1$ is the distance when the second lock mechanism is unlocked to allow floating and $L_3$ is the distance at the maximum backward movement (the maximum floating amount). Specific exemplary values of $L_1$, $L_2$ and $L_3$ are:

| $L_1$ = 15.3 mm | $L_2$ = 12.8 mm | $L_3$ = 10.3 mm |
|---|---|---|

That is, the floating amount in this example is 5 mm.

Figure 23:
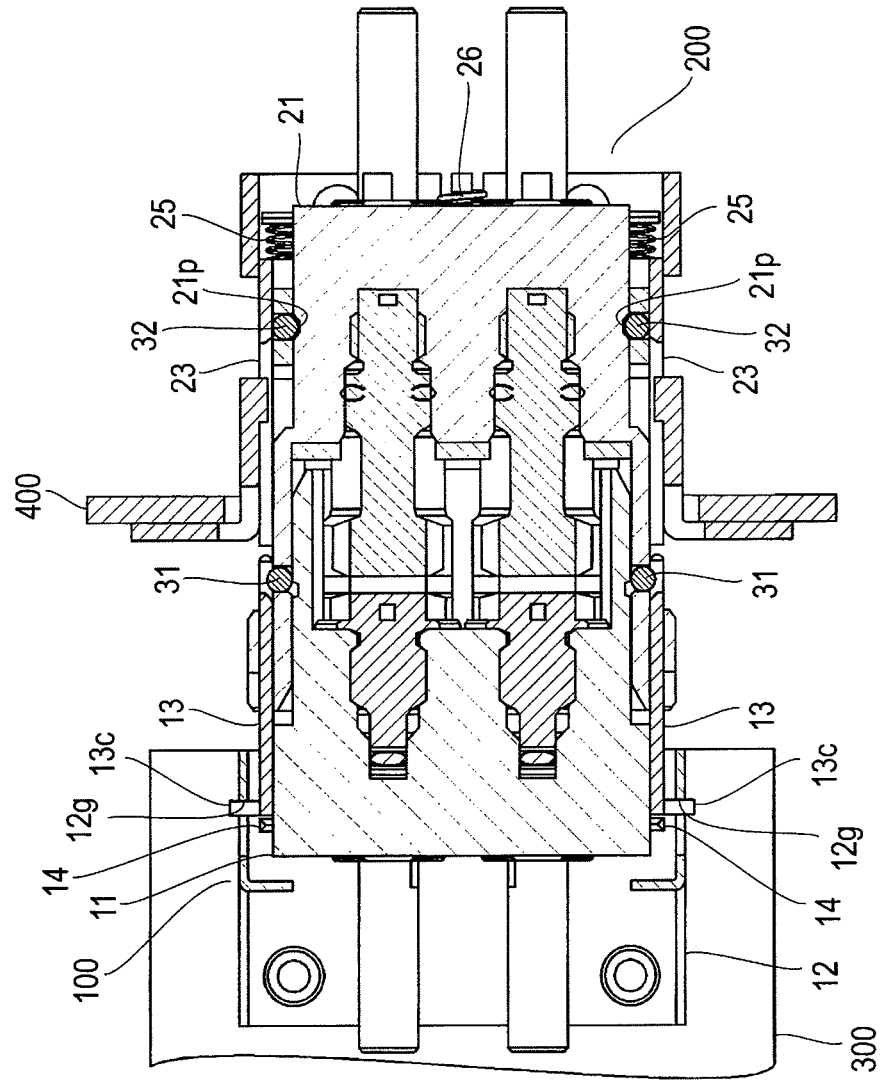
FIG. 23 is a diagram illustrating a detaching state of the first embodiment of the fluid coupler device according to the present invention.
Figure 24A:
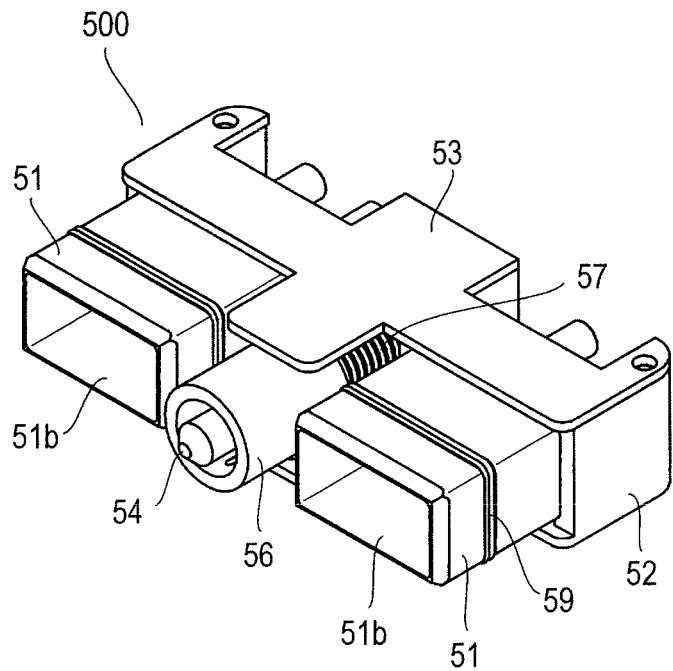
FIG. 24A is a front perspective view of a plug in a second embodiment of a fluid coupler device according to the present invention.
Figure 24B:
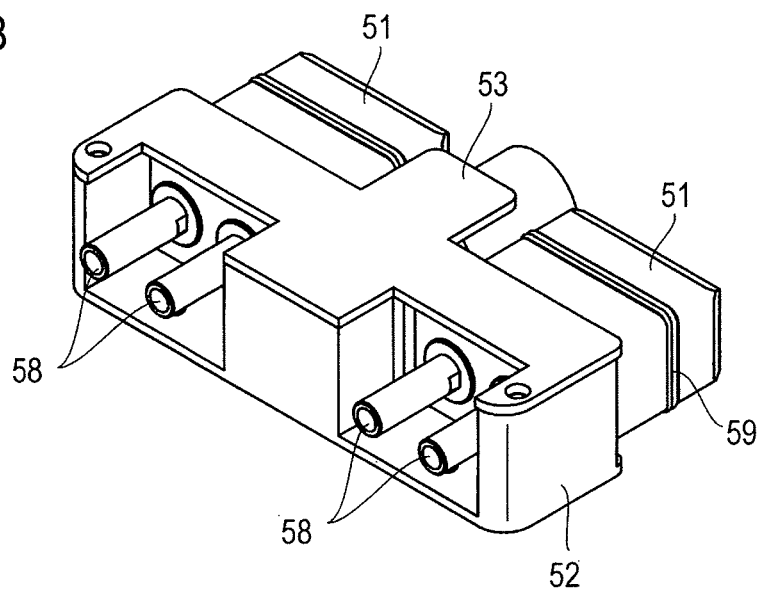
FIG. 24B is a rear perspective view of the plug illustrated in FIG. 24A.

An operation for detaching the plug 100 from the receptacle 200 will be described next with reference to FIG. 23.

When the daughterboard 300 on which the plug 100 is mounted is moved backward, the bracket 12 moves backward together with the daughterboard 300. As a result, the vertically protruding parts 13c of the plug-side sliders 13 hit against the front edges of the windows 12g of the bracket 12 to move the plug-side sliders 13 backward together with the bracket 12. At the same time, the plug-side springs 15 are compressed.

The backward movement of the plug-side sliders 13 allows the first balls 31 to move outward and unlocks the first lock mechanism to detach the plug 100 from the receptacle 200. After the detachment, the resilience of the plug-side springs 15 causes the plug-side sliders 13 to return to the original position.

On the other hand, as the plug-side sliders 13 move backward, the receptacle-side sliders 23 are pushed by the receptacle-side springs 25 to move forward. As the plug 100 is detached, the housing 21 of the receptacle 200 is pushed by the spring 26 to return to the original position. The second balls 32 are pushed by the receptacle-side sliders 23 into the indentations 21p in the housing 21 and, as a result, the housing 21 is fixed to the bracket 22 and returns to the initial state in which backward movement is prevented.

Second Embodiment

FIGS. 24A, 24B and 25A to 25C illustrate a configuration of a plug in a second embodiment of a fluid coupler device according to the present invention. The plug 500 in this example includes two housings 51, a bracket 52, a lid 53, a lock shaft 54, a lock shaft receiver 55, a plug-side slider 56, a plug-side spring 57, four pipes 58, two gaskets 59, four O-rings, and four male members. The O-rings and the male members are omitted from the drawings. Like the male members in the first embodiment, the male members are fluid coupler CGO 03/C plugs on a catalogue of Staubli Corporation.

Figure 25A:
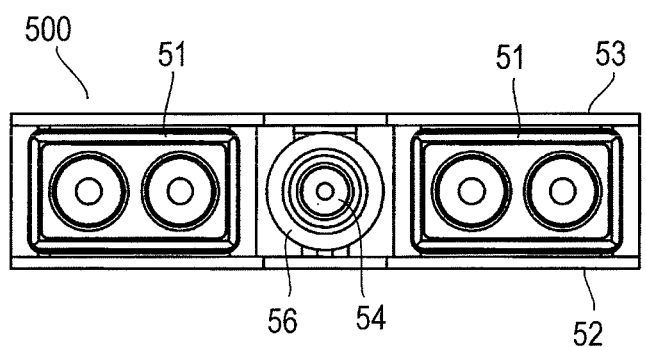
FIG. 25A is a front view of the plug illustrated in FIG. 24A.
Figure 25B:
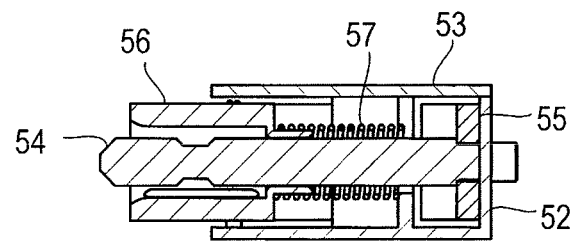
FIG. 25B is a longitudinal cross-sectional view of the plug illustrated in FIG. 24A.
Figure 25C:
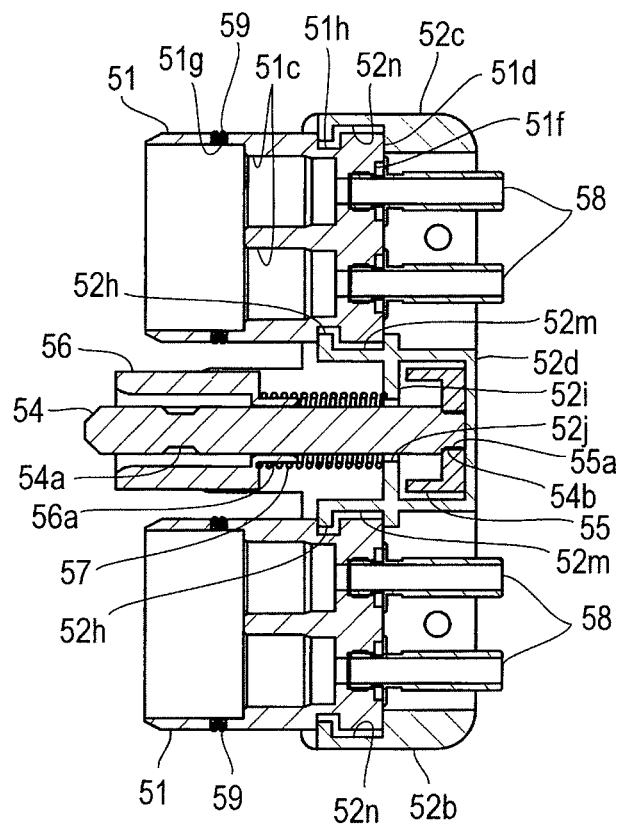
FIG. 25C is a transverse sectional view of the plug illustrated in FIG. 24A.
Figure 26A:
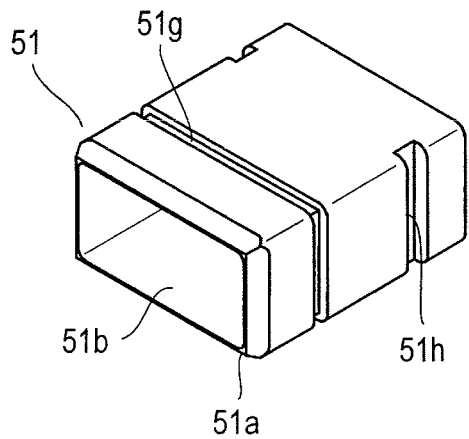
FIG. 26A is a front perspective view of a housing of the plug illustrated in FIG. 24A.
Figure 26B:
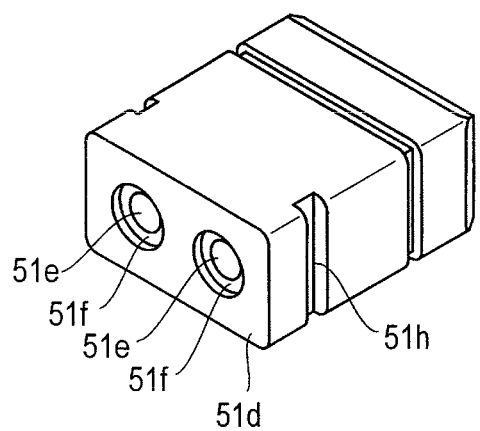
FIG. 26B is a rear perspective view of the housing illustrated in FIG. 26A.

The housing 51 is rectangular as illustrated in FIGS. 26A and 26B. An opening 51b that substantially occupies the front face 51a is formed in the front face 51a. Two receiving holes 51c (see FIG. 25c) that communicate with the opening 51b and receive mail members are formed in the housing 51. The receiving holes 51c are followed by holes 51e that open at the rear face 51d of the housing 51. A recess 51f in which an O-ring is to be placed is formed at an open end of each of the holes 51e.

A groove 51g in which the gasket 59 is to be placed is formed around the outer periphery of the housing 51 in a location on the front face 51a side. A vertical groove 51h is formed in each of both sidewalls of the housing 51 on the rear face 51d side.

Figure 27A:
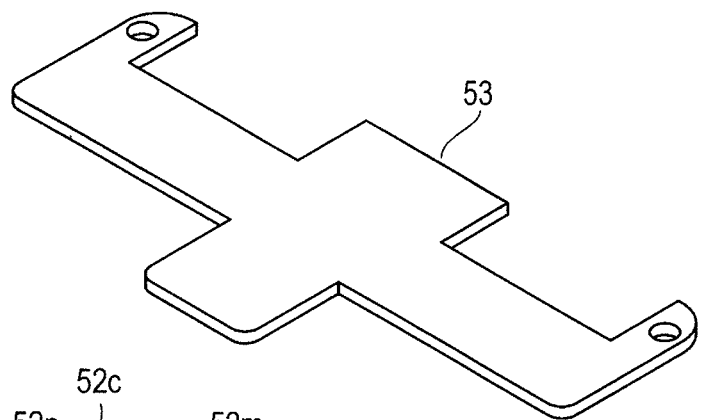
FIG. 27A is a perspective view of a lid of the plug illustrated in FIG. 24A.
Figure 27B:
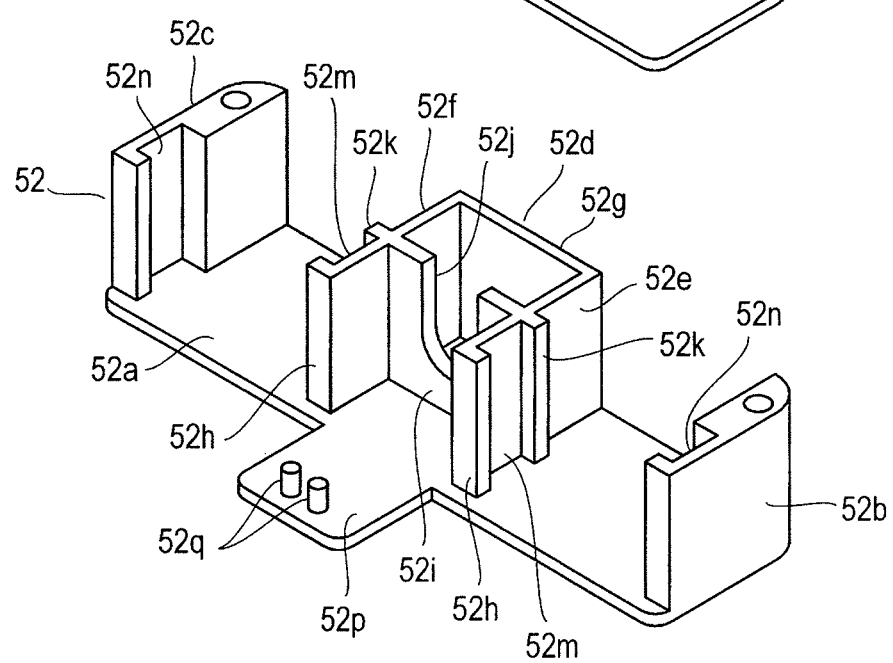
FIG. 27B is a perspective view of a bracket of the plug illustrated in FIG. 24A.
Figure 28A:
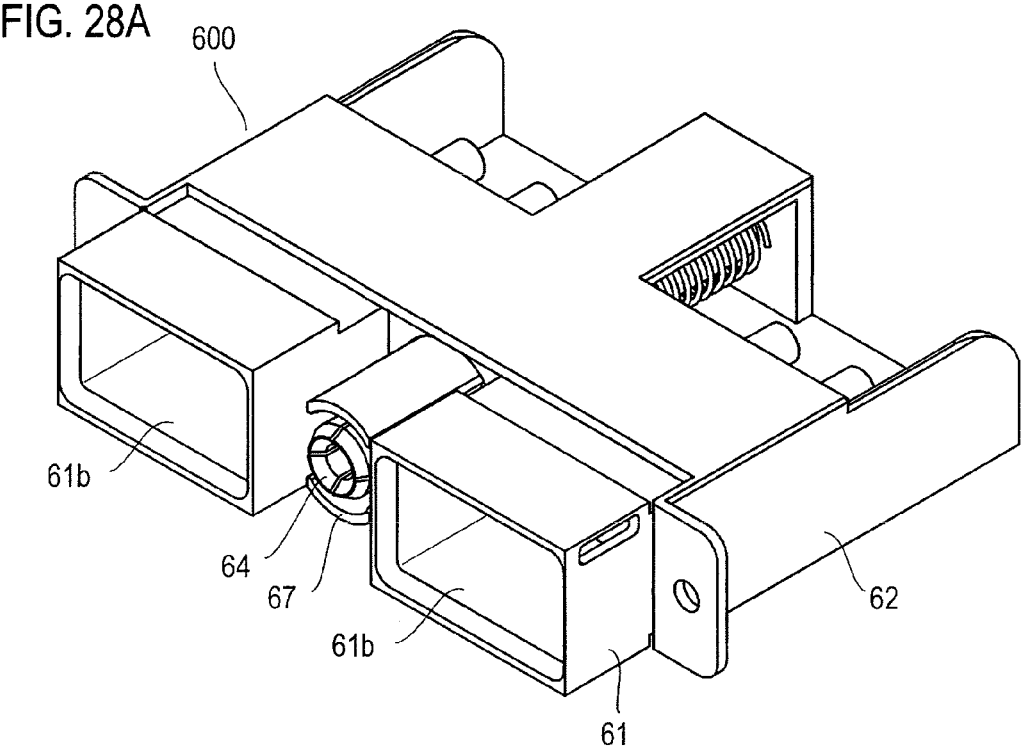
FIG. 28A is a front perspective view of a receptacle of the second embodiment of the fluid coupler device according to the present invention.
Figure 28B:
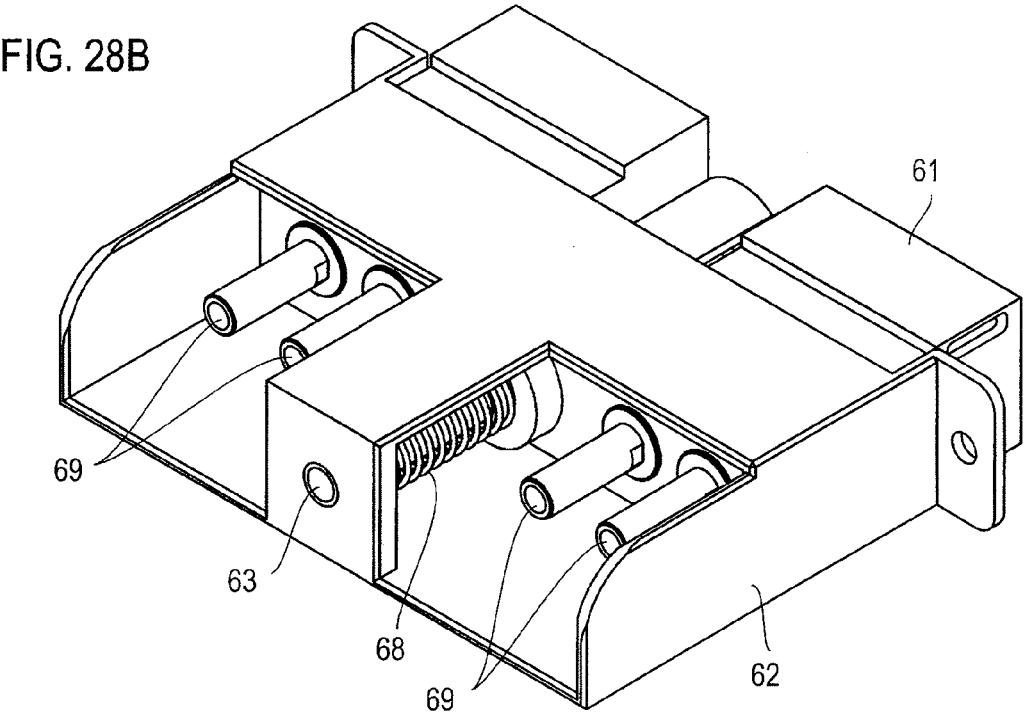
FIG. 28B is a rear perspective view of the receptacle illustrated in FIG. 28A.

The bracket 52 and the lid 53 which covers the top of the bracket 52 have shapes as illustrated in FIGS. 27B and 27A, respectively. The bracket 52 includes a bottom plate part 52a, sidewalls 52b and 52c, and a central protruding part 52d. The central protruding part 52d includes left and right side plates 52e and 52f, and a rear plate 52g. Protrusions 52h that protrude outward are formed at the front ends of the side plates 52e and 52f. A divider plate 52i is provided between the side plates 52e and 52f in parallel to the rear plate 52g.

An oval notch 52j is formed in the divider plate 52i and a protrusion 52k is formed at the outer surface of each of the side plates 52e and 52f in the location where the divider plate 52i is positioned. A recess 52n is formed in each of the sidewalls 52b and 52c in the locations facing the recess 52m formed by the protrusion 52h, 52k and the side plate 52e, 52f. An extended part 52p protruding forward is formed in the center of the bottom plate part 52a and a pair of protrusions 52q are formed on the front end side of the extended part 52p.

The lid 53 is a flat panel, placed on top of the bracket 52, and has the shape that covers the bracket 52.

As in the first embodiment described above, male members of the fluid coupler, not depicted, are fit in and attached to the two receiving holes 51c in the housing 51, O-rings are placed in the two recesses 51f in the rear face 51d and the two pipes 58 are attached to the recesses 51f. The gasket 59 is placed in and attached to the groove 51g around the outer periphery of the housing 51.

In this example, two housings 51 are provided in the bracket 52. The housings 51 are attached to the bracket 52 as illustrated in FIG. 25C. Specifically, the part of the housing 51 further back than the groove 51h is placed between the recesses 52m and 52n of the bracket 52 and the protrusion 52h and the part of each of the sidewalls 52b and 52c that faces the protrusion 52h of the bracket 52 are positioned and attached in the groove 51h in the housing 51.

On the other hand, the lock shaft 54, the lock shaft receiver 55, the plug-side slider 56, and plug-side spring 57 are attached in the center of the bracket 52.

The lock shaft 54 has the shape of a cylinder with a tapered tip and an indentation 54a is formed around the outer periphery of the rock shaft 54 at a location near the tip. The indentation 54a has a trapezoidal cross-sectional shape tapered toward the bottom. The base end of the lock shaft 54 is slightly smaller in diameter and a screw 54b is formed in the smaller-diameter part. The lock shaft receiver 55 is angular U-shaped and a threaded hole 55a is formed in the middle part of the angular U-shape. The plug-side slider 56 is cylindrical and a small-diameter part 56a is provided at one end of the plug-side slider 56.

The lock shaft 54 is attached to the lock shaft receiver 55 with the screw 54b of the lock shaft 54 being driven into the threaded hole 55a in the lock shaft receiver 55. The lock shaft receiver 55 is placed in the central protruding part 52d of the bracket 52 as illustrated in FIG. 25C and the lock shaft 54 passes through the oval notch 52j in the central protruding part 52d and is protruded forward of the plug 500.

The plug-side slider 56 is attached around the lock shaft 54 so as to be positioned toward the tip of the lock shaft 54 and the plug-side spring 57, which is a coil spring, is inserted between the plug-side slider 56 and the divider plate 52i of the bracket 52. The plug-side slider 56 is pressed forward (in the direction in which the receptacle is connected) by the plug-side spring 57. The plug-side slider 56 is positioned on the pair of protrusions 52q of the bracket 52.

After the parts have been attached to the bracket 52 as described above, the top of the bracket 52 is covered with the lid 53 to complete the plug 500.

In the configuration described above, the housings 51 and the pipes 58 are made of an aluminum alloy, for example, the bracket 52, the lid 53, the lock shaft 54, the lock shaft receiver 55, the plug-side slider 56 and the plug-side spring 57 are made of stainless steel, for example. The housings 51 are plated with nickel.

A configuration of a receptacle 600 into which the plug 500 is fit will be described below.

FIGS. 28A, 28B and 29A to 29C illustrate a configuration of the receptacle 600. FIGS. 30A, 30B, 31A, 31B and 32 illustrate components of the receptacle 600 (some components are omitted from the drawings). The receptacle 600 in this example includes a housing 61, a bracket 62, a floating shaft 63, a first tongue lock 64, a tongue lock receiver 65, a second tongue lock 66, a receptacle-side slider 67, a receptacle-side spring 68, four pipes 69, four O-rings, and four female members. The O-rings and the female members are omitted from the drawings. As in the first embodiment, the female members are fluid coupler CGO 03/C sockets on a catalogue of Staubli Corporation.

Figure 29A:
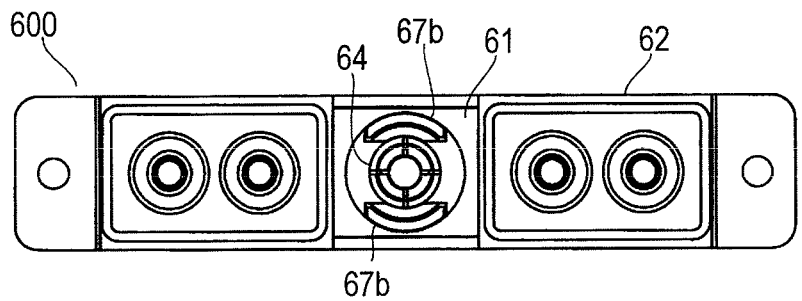
FIG. 29A is a front view of the receptacle illustrated in FIG. 28A.
Figure 29B:
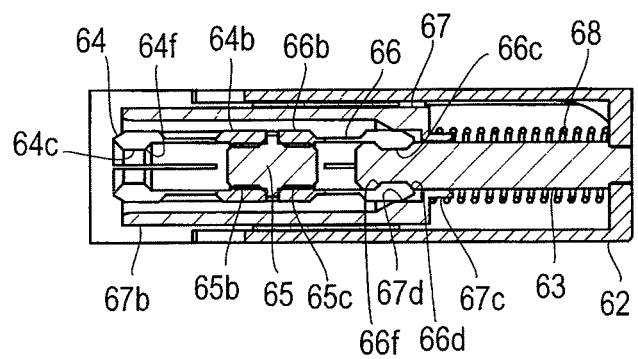
FIG. 29B is a longitudinal sectional view of the receptacle illustrated in FIG. 28A.
Figure 29C:
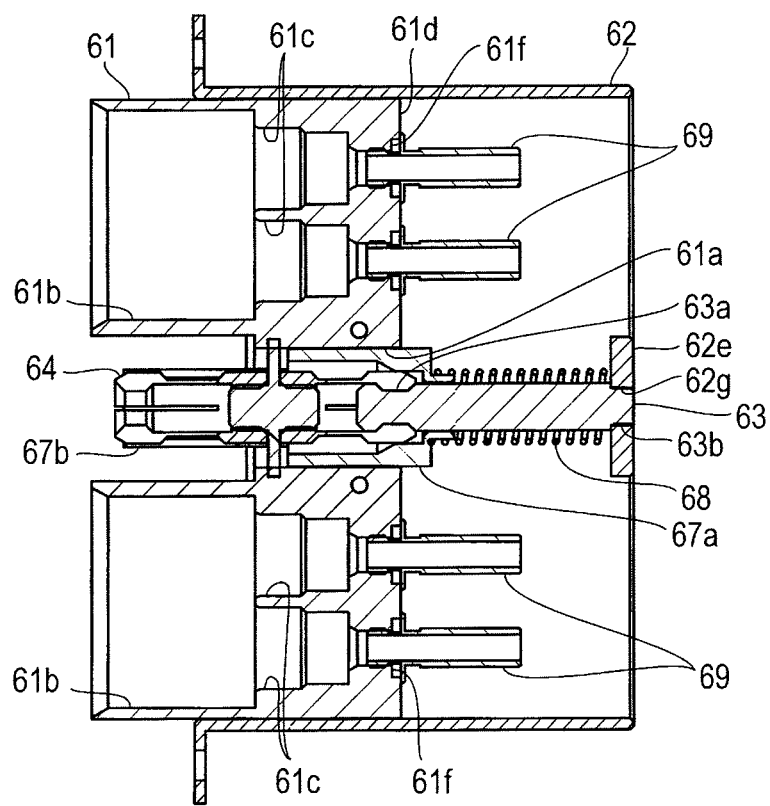
FIG. 29C is a transverse sectional view of the receptacle illustrated in FIG. 28A.
Figure 30A:
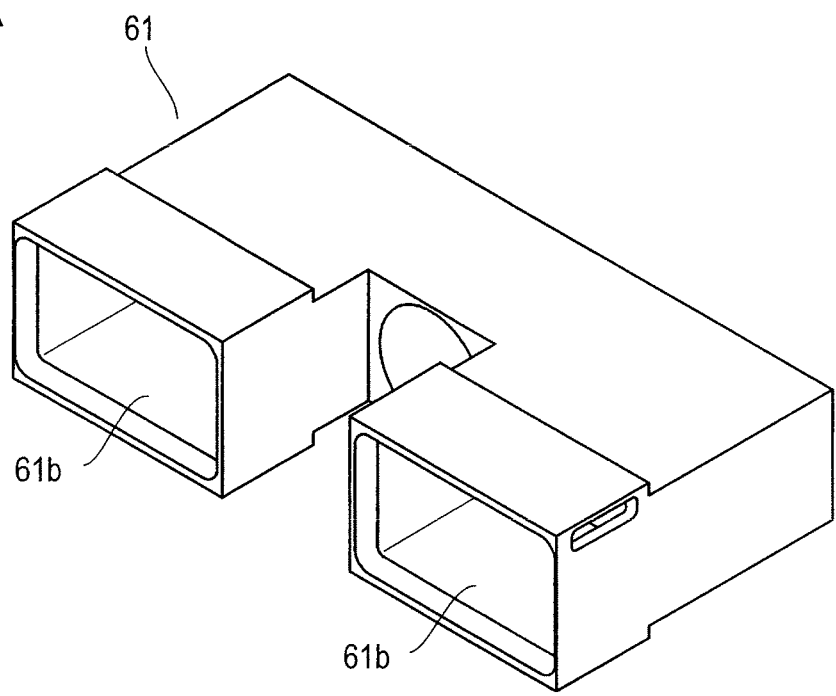
FIG. 30A is a front perspective view of a housing of the receptacle illustrated in FIG. 28A.
Figure 30B:
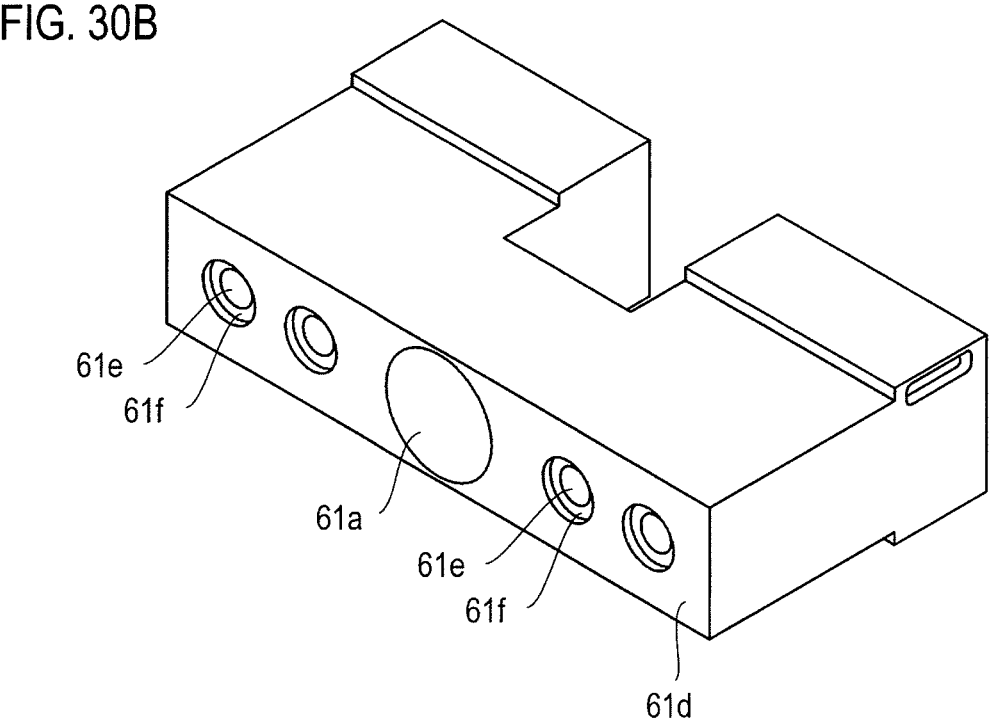
FIG. 30B is a rear perspective view of the housing illustrated in FIG. 30A.

The housing 61 is a block having an angler U-shape as seen from above as illustrated in FIGS. 30A and 30B. A large-diameter hole 61a is bored through in the central portion (the middle portion of the angular U shape). An opening 61b is provided in each of side parts adjacent to the central portion. Two receiving holes 61c (see FIG. 29C) that communicate with the openings 61b and receive female members are formed in the housing 61. The receiving holes 61c are followed by holes 61e that open at the rear face 61d of the housing 61. A recess 61f in which an O-ring is to be placed is formed at the open end of each of the holes 61e.

Figure 31A:
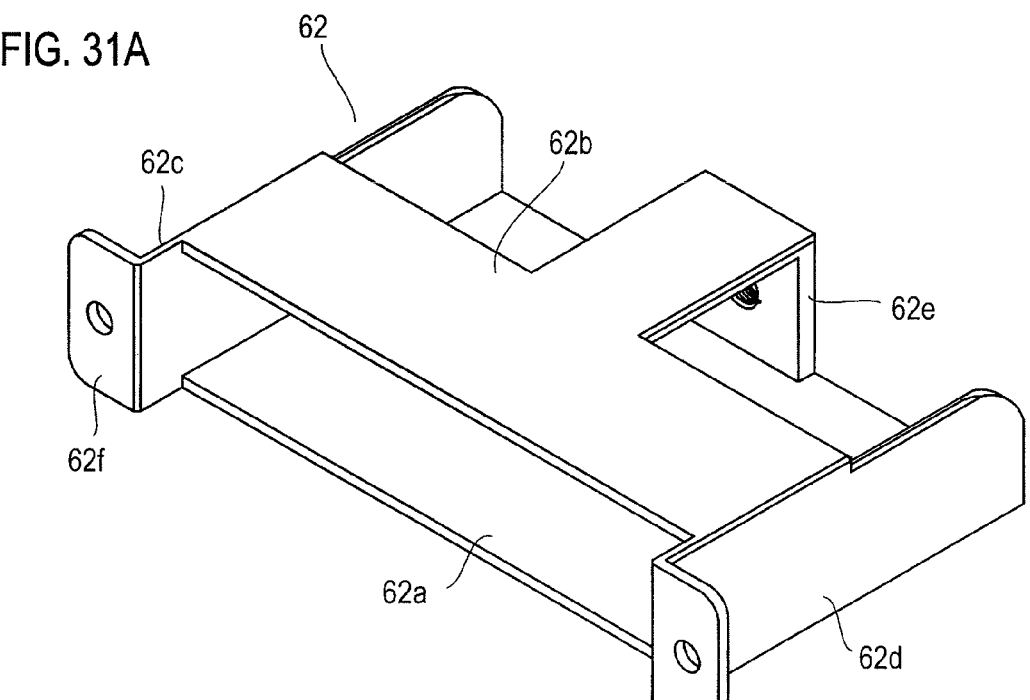
FIG. 31A is a front perspective view of a bracket of the receptacle illustrated in FIG. 28A.
Figure 31B:
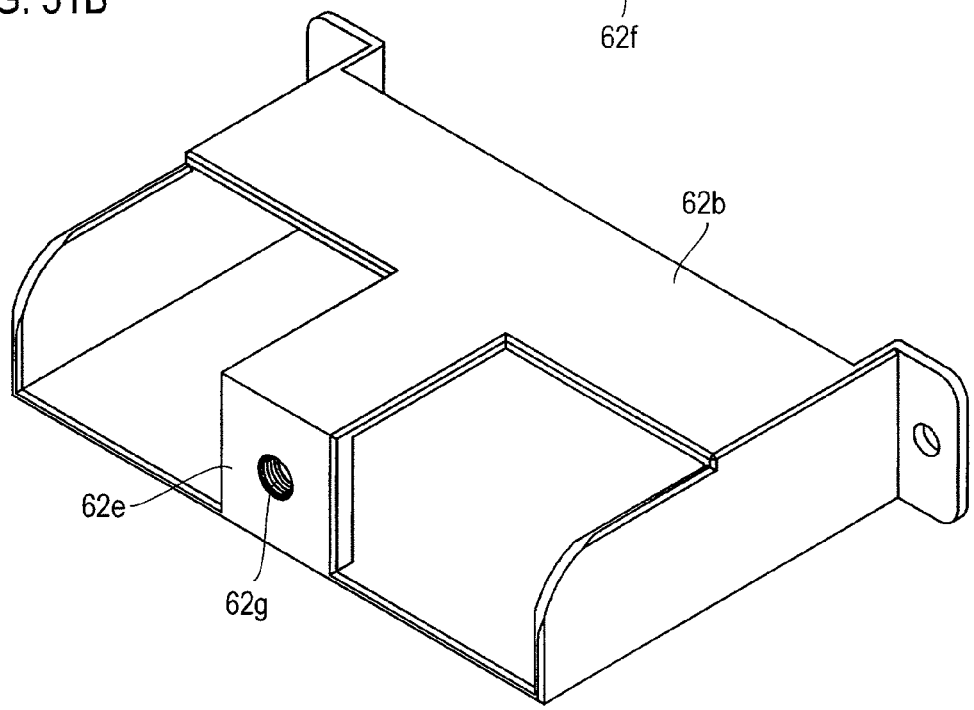
FIG. 31B is a rear perspective view of the bracket illustrated in FIG. 31A.

The bracket 62 has a shape as illustrated in FIGS. 31A and 31B and has a bottom plate part 62a, a top plate part 62, side plate parts 62c and 62d, and a rear panel part 62e. Protruding parts 62f protruding outward are formed at the front ends of the side panel parts 62c and 62d.

Figure 32:
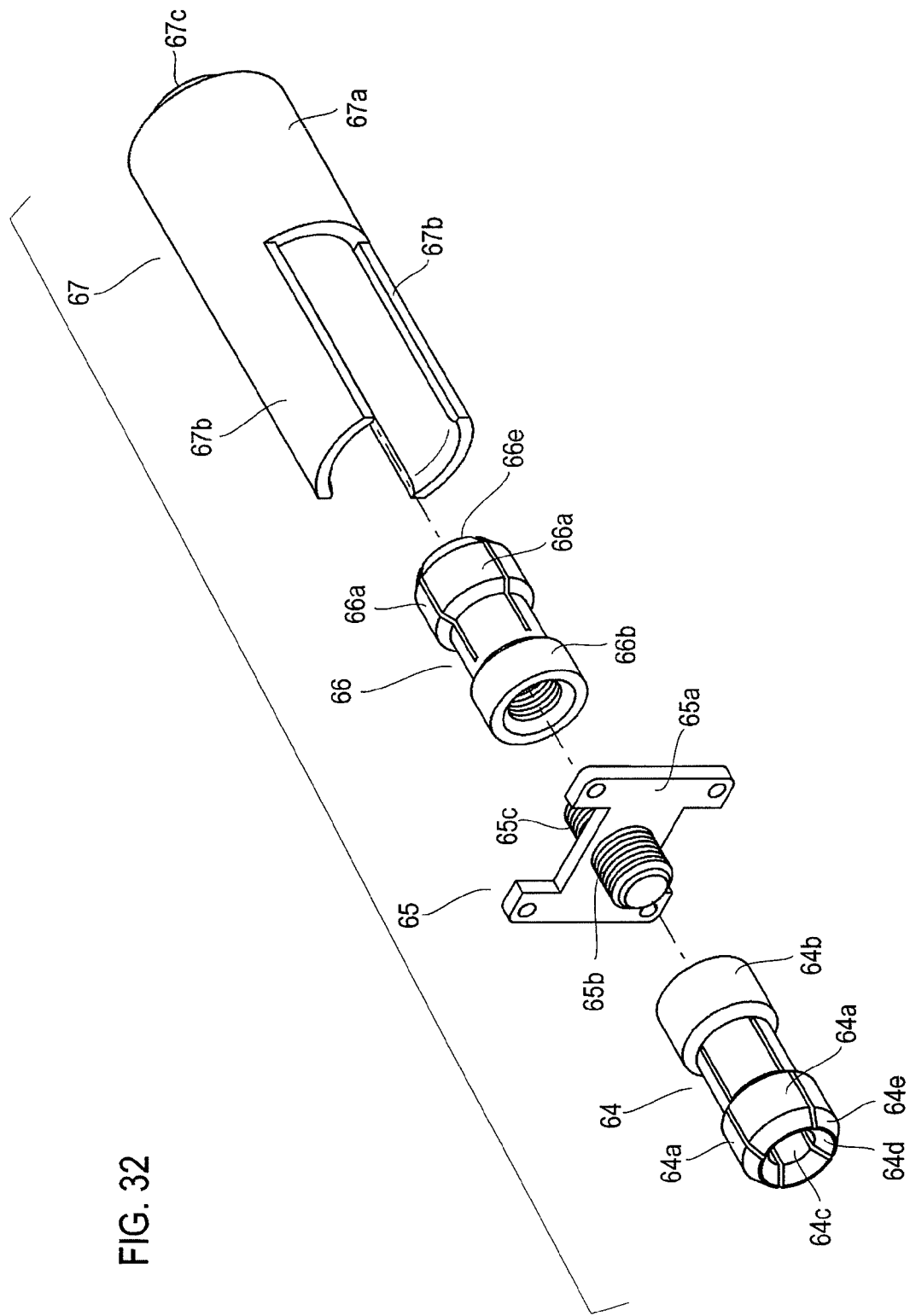
FIG. 32 is a perspective view illustrating a first tongue lock, a tongue lock receiver, a second tongue lock, and a receptacle-side slider of the receptacle illustrated in FIG. 28A.

FIG. 32 illustrates the first tongue lock 64, the tongue lock receiver 65, the second tongue lock 66 and the receptacle-side slider 67 separated by distance and depicted around a common central axis.

The first tongue lock 64 is generally cylindrical and the cylinder is divided into sections along its axis, except one end of the cylinder, to form a plurality of lock pieces 64a. The cylinder in this example is divided into four to form four lock pieces 64a. Each of the lock pieces 64a is a cantilever supported by a supporting part 64b at one end of the cylinder and one half of the cantilever on the base end side is thinner so that the half can be readily elastically dammed. A protrusion 64c that protrudes inward (see FIG. 29B) is formed at the tip of each lock piece 64a. The inner periphery and outer periphery of the tip surface of the lock piece 64a are chamfered to form tapered surfaces 64d and 64e, respectively. The base end of the protrusion 64c is also tapered to form a tapered surface 64f (see FIG. 29B). The inner periphery surface of the supporting part 64b is threaded.

The tongue lock receiver 65 has protruding screws 65b and 65c which are formed on both sides of a center plate part 65a and have a common central axis.

Although the second tongue lock 66 is somewhat shorter than the first tongue lock 64, the second tongue lock 66 has the same shape as the first tongue lock 64. That is, the second tongue lock 66 has four lock pieces 66a, a supporting part 66b, a protrusion 66c, and tapered surfaces 66d, 66e and 66f.

The receptacle-side slider 67 includes a cylindrical part 67a, a pair of protruding pieces 67b which are extended and protruded from locations at an angle of 180° C. with respect to each other at one end of the cylindrical part 67a and have an arc cross-sectional shape, and a small-diameter part 67c provided at the other end of the cylindrical part 67a. A protruding stepped part 67d (see FIG. 29B) is protrudingly formed around the inner periphery of the other end side (small-diameter part 67c side) of the cylindrical part 67a.

Although not depicted, female members of the fluid coupler are fit in and attached to the four receiving holes 61c as in the first embodiment. An O-ring is placed in each of the recesses 61f at the rear face 61d and the four pipes 69 are attached to the recesses 61f.

The rear end side of the housing 61 is placed in the frame formed by the bracket 62 and the front end side at which the opening 61b is provided protrudes from the bracket 62.

The floating shaft 63 is attached to the inner surface of the rear panel part 62e of the bracket 62. The floating shaft 63 is cylindrical and an indentation 63a is formed around the outer periphery of the floating shaft 63 in a location near the front end of the floating shaft 63. The indentation 63a has a trapezoidal cross-section tapered toward the bottom. The base end of the floating shaft 63 has a diameter slightly smaller than that of the rest of the floating shaft 63 and the smaller-diameter portion is threaded to form a screw 63b.

The floating shaft 63 is attached to the bracket 62 with the screw 63b being driven into the threaded hole 62g in the rear panel part 62e.

On the other hand, the supporting part 64b of the first tongue lock 64 is screwed and attached to one 65b of the screws of the tongue lock receiver 65 and the supporting part 66b of the second tongue lock 66 is screwed and attached to the other screw 65c. As a result, the first and second tongue locks 64 and 66 and the tongue lock receiver 65 are joined together into one unit.

The receptacle-side spring 68, which is a coil spring, is disposed around the floating shaft 63 and the receptacle-side slider 67 is disposed. The receptacle-side slider 67 is placed around the floating shaft 63 with the small-diameter part 67c being located at the base end side of the floating shaft 63. The receptacle-side spring 68 is inserted between the receptacle-side slider 67 and the rear panel part 62e of the bracket 62 and the receptacle-side slider 67 is pressed forward (in the direction in which the plug 500 is connected) by the receptacle-side spring 68. Note that the press force of the receptacle-side springs 68 is weaker than that of the plug-side springs 57.

A protrusion 66c of the second tongue lock 66 is engaged in the indentation 63a of the floating shaft 63 to cause the second tongue lock 66 joined with the first tongue lock 64 and the tongue lock receiver 65 in one unit to be placed at the front end side of the floating shaft 63.

The cylindrical part 67a of the receptacle-side slider 67 is inserted and positioned in the hole 61a in the center of the housing 61 as illustrated in FIG. 29C and the pair of protruding pieces 67b are protruded from the housing 61. The first and second tongue locks 64 and 66, the tongue lock receiver 65, and the front end portion of the floating shaft 63 are positioned on the inside of the receptacle-side slider 67. Note that the tongue lock receiver 65 is positioned further forward than the cylindrical part 67a of the receptacle-side slider 67 and is fixed to the housing 61 in a location where the pair of protruding pieces 67b are not positioned.

In the configuration described above, the housing 61 and the pipes 69 are made of an aluminum alloy, for example, and the bracket 62, the floating shaft 63, the first and second tongue locks 64 and 66, the tongue lock receiver 65, the receptacle-side slider 67, and the receptacle-side spring 68 are made of stainless steel, for example. The housing 61 is plated with nickel.

The receptacle 600 in this example includes a first lock mechanism including the first tongue lock 64. The first tongue lock 64 of the first lock mechanism couples and fixes the receptacle 600 to the plug 500 with the protrusions 64c at the front end fitting into the indentation 54a formed in the lock shaft of the plug 500.

The receptacle 600 includes a second lock mechanism including the indentation 63a formed around the outer periphery of the floating shaft 63 and the second tongue lock 66. The second lock mechanism prevents the housing 61 from moving backward with respect to the bracket 62 in the direction opposite to the direction in which the plug 500 is connected, that is, the second lock mechanism prevents activation of the floating mechanism of the receptacle 600.

Figure 33:
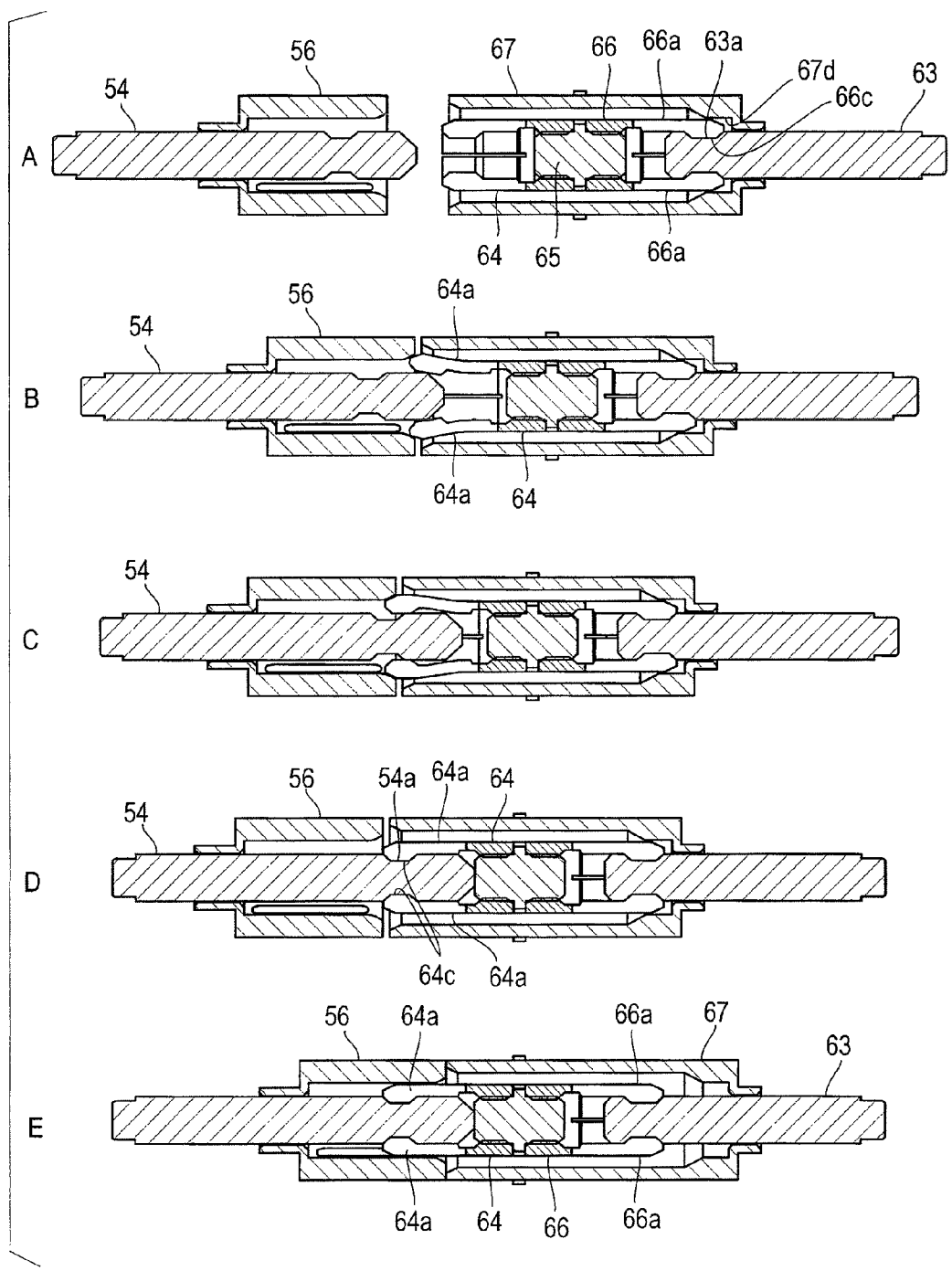
FIG. 33 is a diagram illustrating a fitting operation of the second embodiment of the fluid coupler device according to the present invention.

A fitting operation of a fluid coupler device including the plug 500 and the receptacle 600 described above will be described next with reference to FIG. 33. FIG. 33 illustrates operations of the first and second lock mechanisms, which are major components, and FIG. 33A illustrates a state (the initial state) before fitting. In the initial state, the protrusion 66c of the lock piece 66a of the second tongue lock 66 of the receptacle 600 fits into the indentation 63a formed around the outer periphery of the floating shaft 63, the lock pieces 66a are held by the stepped part 67d of the receptacle-side slider 67 overlying the second tongue lock 66, and the protrusion is fixed in the indentation 63a. This prevents the housing 61 of the receptacle 600 from moving backward.

(1) When the plug 500 is inserted into the receptacle 600, the lock shaft 54 of the plug 500 enters the first tongue lock 64 of the receptacle 600 and the four lock pieces 64a are pushed open outward. The plug-side slider 56 located outside the lock shaft 54 hits against the opened lock pieces 64a and is prevented from moving forward (FIG. 33B).

(2) As the plug 500 is inserted further, the plug-side spring 57 is compressed and only the lock shaft 54 moves forward (FIG. 33C). The housing 51 of the plug 500 moves forward together with the lock shaft 54.

(3) When the housing 51 moves forward and the connection between the male members and female members is complete, the protrusions 64c of the lock pieces 64a of the first tongue lock 64 fit into the indentation 54a formed around the outer periphery of the lock shaft 54 (FIG. 33D). This removes the prevention of movement of the plug-side slider 56 and the plug-side slider 56 is pushed forward by the plug-side spring 57.

(4) Since the plug-side slider 56 has moved forward, the lock pieces 64a of the first tongue lock 64 are pressed by the plug-side slider 56. This places the first lock mechanism including the first tongue lock 64 in the lock state and the housing 51 of the plug 500 and the housing 61 of the receptacle 600 are coupled and fixed together. The plug-side slider 56 hits against the receptacle-side slider 67, which is then pushed backward by the plug-side slider 56 (FIG. 33E).

(5) The backward movement of the receptacle-side slider 67 removes the press of the lock pieces 66a of the second tongue lock 66. The lock pieces 66a become deformable, that is, the second tongue lock 66 is allowed to be displaced in the direction of the axis of the floating shaft 63, and the second lock mechanism is unlocked. The housing 61 of the receptacle 600 is allowed to move backward with respect to the bracket 62 and floats together with the housing 51 of the plug 500 coupled with the receptacle 600.

The first and second embodiments of a fluid coupler device according to the present invention have been described. In any of the embodiments, the receptacle floats and is allowed to move backward after the plug and the receptacle have been coupled together and the male and female members of the fluid coupler have been connected together. Accordingly, the backward movement of the receptacle can be used to connect with another connector or the like with a time difference from the connection of the fluid coupler. In other words, another connector or the like can be connected in the absence of an excessive force applied during the connection of the fluid coupler. Accordingly, the fluid coupler device according to the present invention can be installed together with and connected in combination with a connector that cannot withstand a large press force, for example an optical connector.

Specifically, for example the present invention enables the use of a previously impossible system in which an optical connector and a fluid coupler for cooling water piping are mounted on a daughterboard and are collectively connected to a backboard and enables implementation of an interface structure of a daughterboard including an optical connector and a plug for a fluid coupler device. Mounting locations of the optical connector and the plug of the fluid coupler device on a daughterboard are chosen such that the optical connector is connected after the second lock mechanism is unlocked to allow the receptacle of the fluid coupler device mounted on the backboard to move backward (after the receptacle comes into a floating state).

While fluid coupler CGO 03/C plugs and sockets on catalogues of Staubli Corporation are used as the male and female members of the fluid couplers in the embodiments described above, the male and female members are not limited to these. Any types of fluid coupler can be used that has a structure in which a male member is pushed into a female member and, when the male member reaches a predetermined position, a fluid blocking mechanism is released.

What is claimed is:

1. A fluid coupler device comprising a plug receiving one of a male member attached to an end of a pipe and a female member attached to an end of a pipe and a receptacle receiving the other of the male member and the female member for coupling the pipes through which a fluid flows;
   wherein the receptacle comprises:
   a receptacle-side slider including a floating mechanism capable of moving backward in the direction opposite to a direction in which the plug is to be connected and being pressed by a receptacle-side spring in the direction in which the plug is to be connected;
   a first lock mechanism functioning to couple and fix the receptacle to the plug; and
   a second lock mechanism functioning to prevent the backward movement of the floating mechanism;
   the plug comprises:
   a plug-side slider being pressed by a plug-side spring in the direction in which the receptacle is to be connected; and
   an indentation in which the first lock mechanism fits, a press force of the plug-side spring being stronger than that of the receptacle-side spring; and
   when the plug is inserted into the receptacle, the plug-side slider hits against the first lock mechanism and is prevented from moving forward, the plug-side spring is compressed to move only the plug forward;
   when connection between the male member and the female member is complete, the first lock mechanism fits into the indentation and movement of the plug-side slider is no longer prevented, in order to move the plug-side slider forward;
   the forward movement of the plug-side slider places the first lock mechanism in a lock state to couple and fix the plug to the receptacle and the plug-side slider pushes the receptacle-side slider to cause the receptacle-side slider to move backward; and
   the backward movement of the receptacle-side slider unlocks the second lock mechanism to cause the floating mechanism to move the receptacle backward.

2. The fluid coupler device according to claim 1,
   wherein the first lock mechanism comprises a first ball held by a receptacle sidewall so as to be movable in the direction perpendicular to a direction in which the plug is to be connected; and
   when the plug is inserted into the receptacle, the first ball is pushed by a plug sidewall inserted on the inside of the receptacle sidewall so that the first ball protrudes outside the receptacle sidewall and the plug-side slider positioned on the outside of the receptacle sidewall is prevented from moving forward;
   when connection between the male member and the female member is complete, the indentation formed in the plug sidewall reaches the location of the first ball and the first ball is pushed by the plug-side slider so that the first ball protrudes on the inside of the receptacle sidewall and fits in the indentation;

the second lock mechanism comprises an indentation provided in the receptacle sidewall and a second ball held by a bracket sidewall positioned on the outside of the receptacle sidewall so as to be movable in the direction perpendicular to a direction in which the plug is to be connected;

the second ball is pushed by the receptacle-side slider positioned on the outside of the bracket sidewall so that the second ball protrudes on the inside of the bracket sidewall and fits into an indentation in the receptacle sidewall to prevent the backward movement of the floating mechanism; and the backward movement of the receptacle-side slider allows the second ball to move to unlock the second lock mechanism.

3. An interface structure of a daughterboard to be vertically attached to a backboard, comprising:

an optical connector and a plug of a fluid coupler device according to claim 2, wherein locations in which the plug and the optical connector are attached are chosen so that the optical connector is connected after a receptacle of the fluid coupler device is allowed to move backward by unlocking the second lock mechanism, the receptacle being attached to the backboard.

4. The fluid coupler device according to claim 1, wherein the first lock mechanism comprises a first tongue lock including a plurality of lock pieces formed by axially dividing a cylinder excluding one end of the cylinder, each of the lock pieces having a protrusion formed at a front end of the lock piece, the protrusions protruding inward; and when the plug is inserted into the receptacle, a lock shaft on the plug side enters the first tongue lock, the plurality of lock pieces are pushed and opened outward to prevent the plug-side slider positioned on the outside of the lock shaft from moving forward;

when connection between the male member and the female member is complete, the protrusions of the first tongue lock fits into the indentation formed in an outer periphery of the lock shaft;

the second lock mechanism comprises an indentation formed in an outer periphery of a floating shaft and a second tongue lock including a plurality of lock pieces formed by axially dividing a cylinder excluding one end of the cylinder, each of the lock pieces having a protrusion formed at a front end of the lock piece, the protrusions protruding inward;

a protrusion of the second tongue lock fits into the indentation in the floating shaft and the receptacle-side slider overlies the second tongue lock to prevents the backward movement of the floating mechanism; and the backward movement of the receptacle-side slider allows displacement of the second tongue lock to unlock the second lock mechanism.

5. An interface structure of a daughterboard to be vertically attached to a backboard, comprising:

an optical connector and a plug of a fluid coupler device according to claim 4, wherein locations in which the plug and the optical connector are attached are chosen so that the optical connector is connected after a receptacle of the fluid coupler device is allowed to move backward by unlocking the second lock mechanism, the receptacle being attached to the backboard.

6. An interface structure of a daughterboard to be vertically attached to a backboard, comprising:

an optical connector and a plug of a fluid coupler device according to claim 1, wherein locations in which the plug and the optical connector are attached are chosen so that the optical connector is connected after a receptacle of the fluid coupler device is allowed to move backward by unlocking the second lock mechanism, the receptacle being attached to the backboard.

* * * * *